(12) United States Patent
Neiser

(10) Patent No.: US 8,763,788 B2
(45) Date of Patent: Jul. 1, 2014

(54) ZONED ACCUMULATION CONVEYOR

(75) Inventor: Raymond R. Neiser, Batavia, OH (US)

(73) Assignee: Intelligrated Headquarters LLC, Mason, OH (US)

( * ) Notice: Subject to any disclaimer, the term of this patent is extended or adjusted under 35 U.S.C. 154(b) by 277 days.

(21) Appl. No.: 12/727,634

(22) Filed: Mar. 19, 2010

(65) Prior Publication Data

US 2011/0067977 A1    Mar. 24, 2011

Related U.S. Application Data

(60) Provisional application No. 61/210,750, filed on Sep. 19, 2009.

(51) Int. Cl.
   *B65G 47/26*    (2006.01)

(52) U.S. Cl.
   CPC ............ *B65G 47/268* (2013.01); *B65G 47/261* (2013.01)
   USPC ..................... 198/781.01; 198/617

(58) Field of Classification Search
   USPC ................. 198/781.01–781.11, 617
   See application file for complete search history.

(56) References Cited

U.S. PATENT DOCUMENTS

| | | | | |
|---|---|---|---|---|
| 4,108,303 A * | 8/1978 | Vogt et al. | ................ | 198/781.06 |
| 4,109,783 A | 8/1978 | Vogt | | |
| 5,823,319 A * | 10/1998 | Resnick et al. | .......... | 198/781.06 |
| 5,862,907 A | 1/1999 | Taylor | | |
| 6,405,851 B1 | 6/2002 | Takeda | | |
| 6,827,202 B2 * | 12/2004 | Topmiller et al. | ........ | 198/781.05 |
| 6,843,362 B2 * | 1/2005 | Tachibana et al. | ......... | 198/460.1 |
| 6,860,381 B2 * | 3/2005 | Newsom et al. | ......... | 198/781.05 |
| 6,889,822 B1 | 5/2005 | Wagner et al. | | |
| 2003/0168316 A1 | 9/2003 | Knepple | | |
| 2006/0289279 A1 | 12/2006 | Taylor | | |
| 2007/0119690 A1 | 5/2007 | Lupton | | |

FOREIGN PATENT DOCUMENTS

| | | |
|---|---|---|
| JP | 04-201917 | 7/1992 |
| JP | 05-155411 | 6/1993 |
| JP | 2002-226031 | 8/2002 |
| JP | 2002-240926 | 8/2002 |
| JP | 2003-221112 | 8/2003 |
| JP | 2003-292140 | 10/2003 |

OTHER PUBLICATIONS

Japanese Office Action dated Apr. 16, 2013 for Application No. JP 2012-500995.
English Machine Translation of Japanese Patent No. JP 2002-226031.
English Machine Translation of Japanese Patent No. JP 2002-240926.
English Machine Translation of Japanese Patent No. JP 2003-221112.
English Machine Translation of Japanese Patent No. JP 2003-292140.
International Search Report and Written Opinion dated Sep. 21, 2010 for Application No. PCT/US2010/027983.

\* cited by examiner

*Primary Examiner* — Mark A Deuble
(74) *Attorney, Agent, or Firm* — Frost Brown Todd LLC

(57) ABSTRACT

An accumulation conveyor with individually controllable zones may be controlled in a manner which efficiently reduces the gaps between accumulated articles, accomplished by control logic which determines the existence of conditions conducive to reducing the gaps and implements the control logic as appropriate. The accumulation conveyor may be controlled in a coast to stop mode. The accumulation conveyor may be controlled in manner to detect and clear jams.

19 Claims, 22 Drawing Sheets

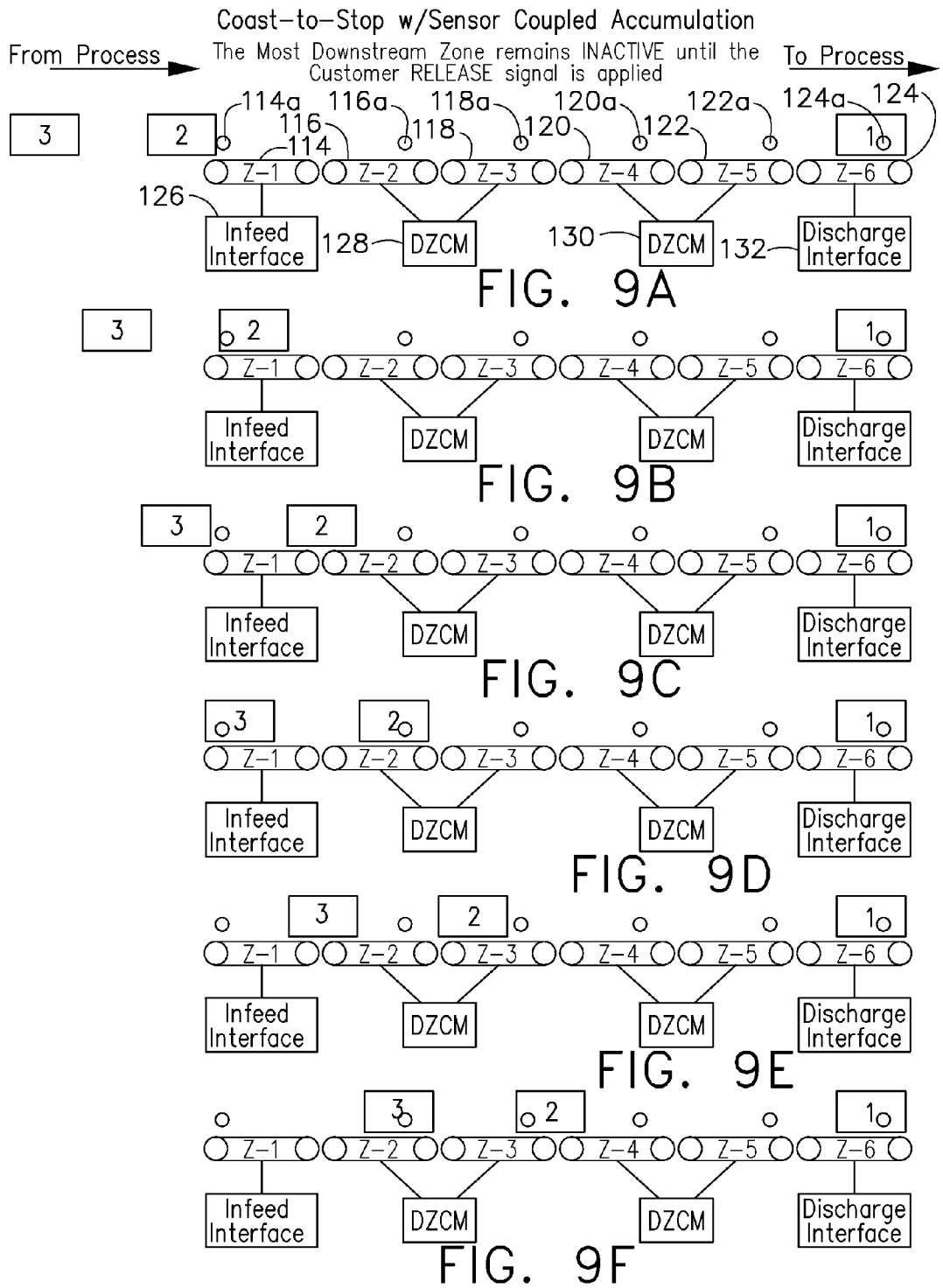

ZONED ACCUMULATION CONVEYOR

This application claims priority from U.S. Provisional Patent Application Ser. No. 61/210,750, filed on Mar. 19, 2009, the disclosure of which is incorporated herein by reference.

BACKGROUND

The present invention relates generally to conveyors, and more particularly to accumulation conveyors. The invention will be disclosed in connection with, but not necessarily limited to, zoned accumulation conveyors comprising control modules configured to control two zones which monitor and control product flow on the accumulation conveyor.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIGS. 9A-9L 6 are diagrammatic zones illustrating operation of an accumulation conveyor in coast to stop with sensor coupled accumulation mode.

Figure 1:
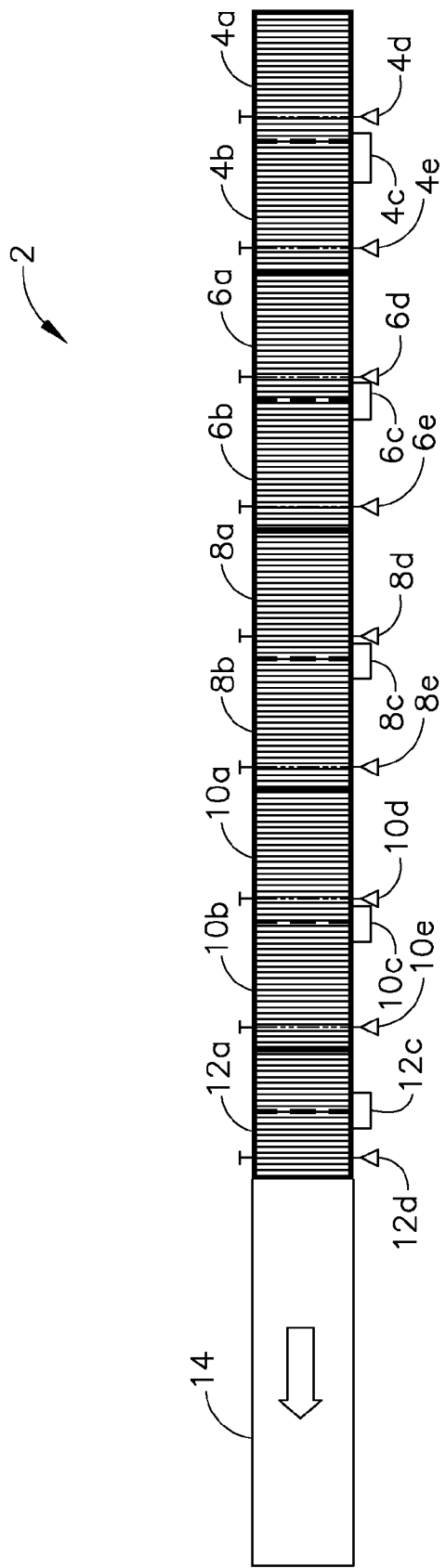
FIG. 1 is a plan view of an accumulation conveyor embodying one or more teachings of the present invention.

Reference will now be made in detail to the present preferred embodiment of the invention, an example of which is illustrated in the accompanying drawings.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment of the invention will now be described.

Referring to FIG. 1, there is shown a plan view of an accumulation conveyor embodying one or more teachings of the present invention. Accumulation conveyor, generally indicated at 2, includes a plurality of individually controllable zones 4a, 4b, 6a, 6b, 8a, 8b, 10a, 10b and 12a. Although in the embodiment depicted in FIG. 1 there are nine zones, the present invention is not limited to nine zones. In the embodiment depicted, zones are generally six feet long, twice as long as a typical accumulation conveyor zone, resulting in reduced manufacturing cost. As will be appreciated, the present invention provides for efficient accumulation of packages even though the zones are longer than as is typical. However, the present invention is not limited to long zones nor six feet long zones.

Each zone is selectively driven in any suitable manner as is known in the art, such as the drive arrangement shown in U.S. Pat. No. 6,889,822, the disclosure of which is incorporated herein by reference. In the embodiment depicted, each zone of accumulation conveyor 2 comprises a plurality of conveyor rollers (diagrammatically illustrated) which may be selectively driven by urging an underlying drive belt (not shown) against the conveyor rollers using pneumatic actuators (not shown). In the embodiment depicted, each module 4c, 6c, 8c, 10c and 12c is configured to control the pneumatic actuators (not shown) of their associated zones, and is therefore connected to a pneumatic source. The modules 4c, 6c, 8c, 10c and 12c may be pneumatically daisy chained together. Other drive arrangements include motorized drive rollers, with modules 4c, 6c, 8c, 10c and 12c configured appropriately therefor.

In the embodiment depicted, each pair of zones has respective zone control modules 4c, 6c, 8c and 10c. Zone control modules 4c, 6c, 8c and 10c each control two zones, while zone interface module 12c controls zone 12a, the discharge zone which discharges to take-away conveyor 14 illustrated as a declined belt in the embodiment depicted.

Each zone 4a, 4b, 6a, 6b, 8a, 8b, 10a, 10b and 12a includes respective sensors 4d, 4e, 6d, 6e, 8d, 8e, 10d and 10e and 12d connected to the respective zones' modules. In the embodiment depicted, the sensors are photo eyes with respective reflectors, although any suitable sensor may be used, such as roller sensors or diffused scan sensors. The positions and orientations of the sensors, also referred to herein as photo eyes, within the zones are selected based on the system parameters, such as length or type of packages.

Figure 2:
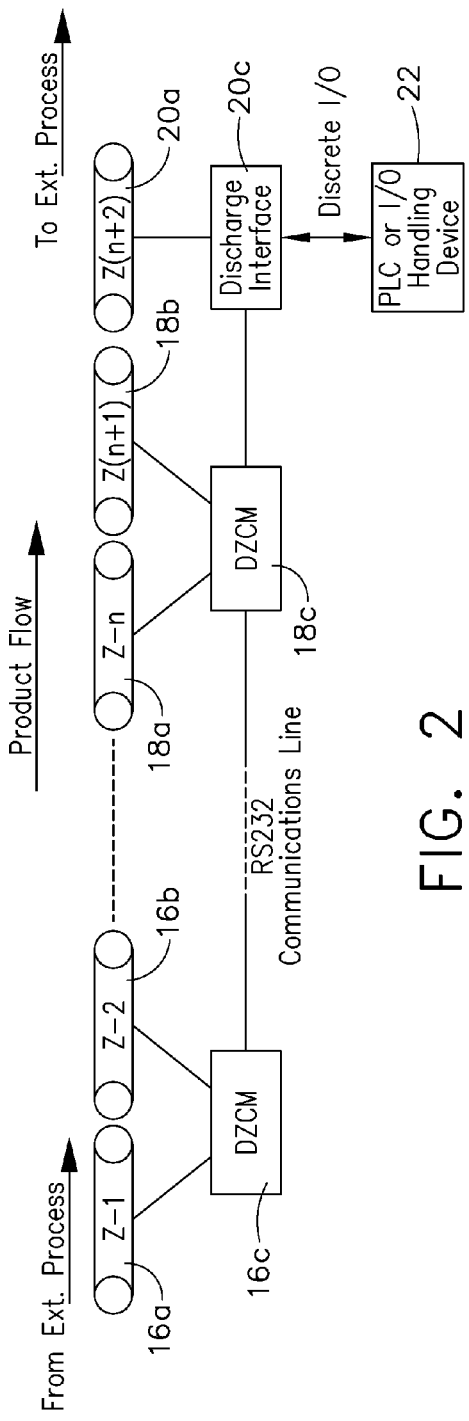
FIGS. 2-5 are diagrammatic side views illustrating different arrangements of zone control modules and interface modules.

FIGS. 2-5 diagrammatically illustrate different arrangements of zone control modules and interface modules. Referring to FIG. 2, there is illustrated an arrangement similar to accumulation conveyor 2 of FIG. 1, in which there are Z(n+2) zones, represented by diagrammatically illustrated conveyors 16a, 16b, 18a, 18b and 20a. Zone control modules 16c and 18c are disposed to control the pairs of conveyors that form the respective zones. Zone interface module 20c is disposed to control conveyor 20a, the discharge zone, making zone interface module 20c the discharge interface module.

The system operates on RS232 communication between zone control modules 16c, 18c and interface module 20c, as illustrated by the lines therebetween in FIG. 2. Zone control modules 16c and 18c are each configured to receive information from respective sensors (not shown in FIGS. 2-4) of each of the two zones respectively controlled by a single control module so as to detect product in the respective zone, are configured to control the movement of product (pneumatically in the embodiment depicted) within each of the two zones, and configured to allow zone information to be distributed among the modules.

Interface module 20c is configured to control a single zone in the manner discussed above with respect to zone control modules, the only difference in this regard being limited to controlling a single zone. Interface module 20c also controls the direction of travel of the conveyor, through the use of DIP switches. (Zone controls 16c and 18c do have a default direction of travel.) Interface module 20c is also configured to use discrete I/O to allow control of the movement of product on the accumulation conveyor, allow external systems to monitor the fill state of a conveyor and allow external systems to monitor fault conditions. I/O from/to an external device is indicated at 22.

Figure 3:
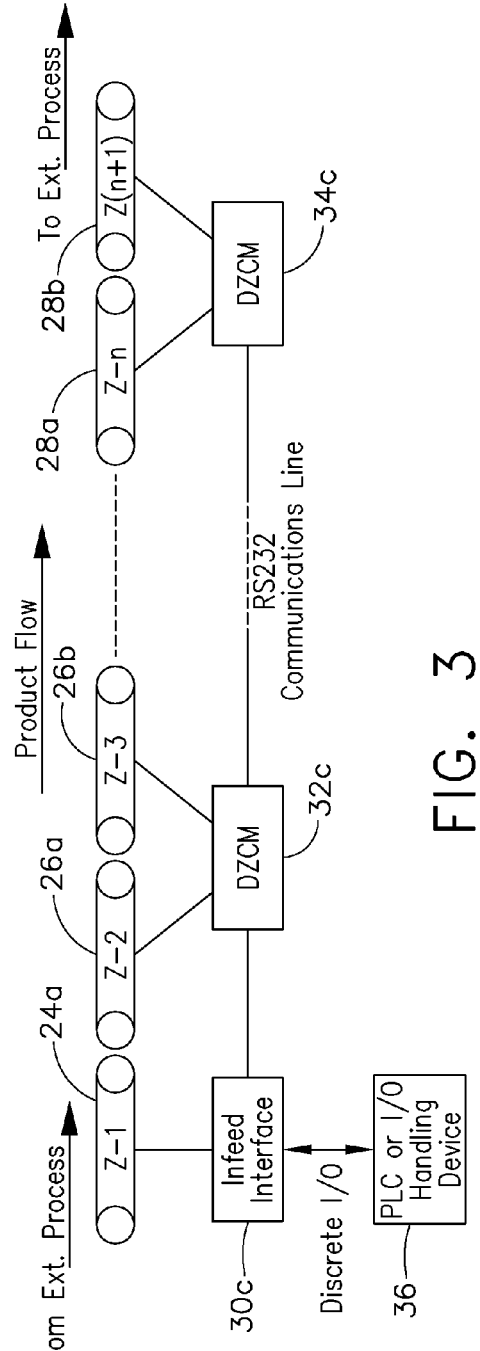

FIG. 2 illustrates the use of interface module 20c as a discharge interface module, by virtue of controlling the single zone which is at the discharge. FIG. 3 differs from FIG. 2 in that interface module 30c is disposed to control infeed conveyor 24a instead of a discharge conveyor. Interface module 30c is designated as the infeed interface module, performing the same functions as discharge interface module 20c.

Although it is possible to configure the accumulation conveyor without an interface module, the embodiments depicted herein have an interface module. Determination whether to have an infeed or discharge interface module depends mostly on practical consideration based, for example, in convenience, minimizing wiring, which end of the conveyor is desirable to have interface with the line, etc.

Figure 4:
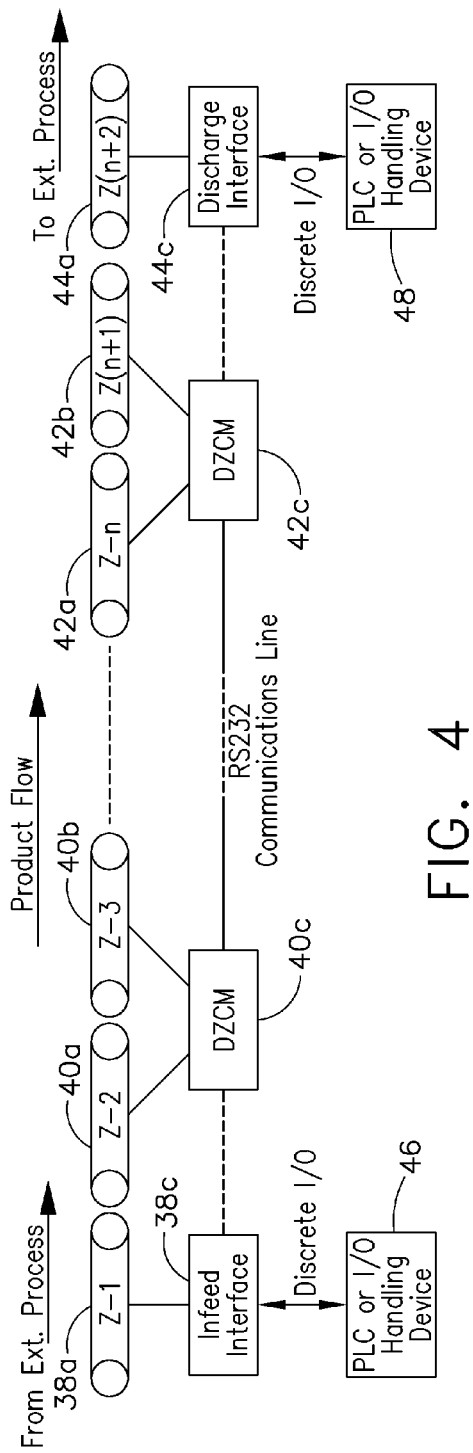

FIGS. 2 and 3 illustrate accumulation conveyors with an odd number of zones, each with one interface module 20c or 30c. FIG. 4 illustrates an accumulation conveyor with an even number of zones, for which two interface modules are used, infeed interface module 38c and discharge interface module 44c, each of which is configured as previously described.

Figure 5:
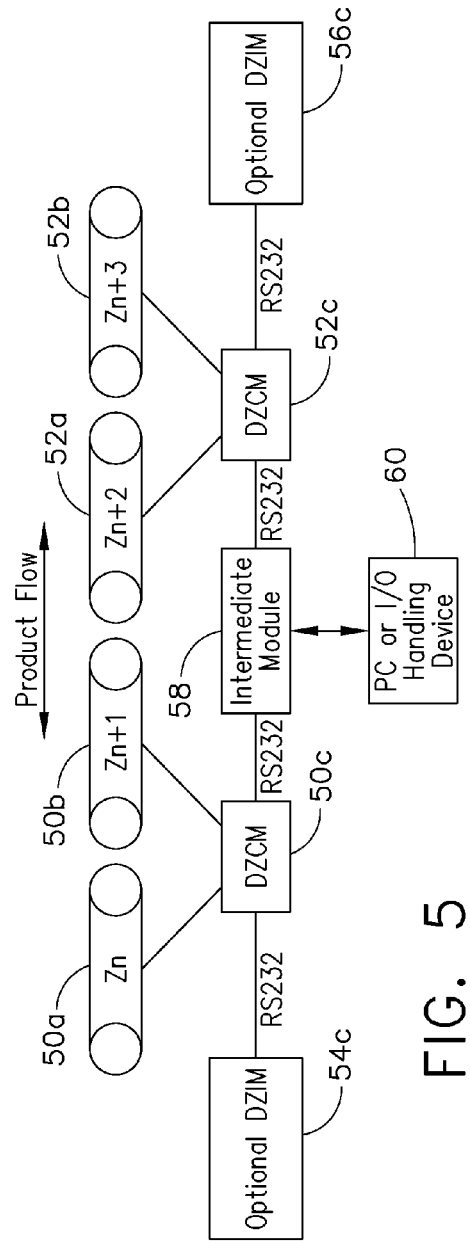

FIG. 5 illustrates an accumulation conveyor in which the direction of product flow is not restricted based on the physical configuration. The system includes intermediate module 58, which controls no conveyor or zones, being configured to use discrete I/O to allow control of the movement of product on the accumulation conveyor, allow external systems to monitor the fill state of a conveyor and allow external systems to monitor fault conditions. Intermediate module 58 is simply an I/O handler for external system requirements. It is not considered an upstream or downstream device, but when information is passed to it, it will adjust the message per its local I/O settings and send the adjusted message on to its neighbor in the required direction of communication flow. Any number of intermediate modules may be used in any position within the zone control module string.

There are also shown in FIG. 5 optional infeed interface module 50c and optional discharge interface module 52c, although it is preferred that each accumulation conveyor have at least one of either.

An accumulation conveyor constructed in accordance with the teachings of the present invention operates in accumulation mode unless there is a release signal from an external source, such as a PLC. The present invention contemplates four basic accumulation modes: coast to stop; coast to stop —sensor coupled; run up once; and run up once —sensor coupled. The accumulation mode is determined by the position of DIP switches on an interface module or intermediate module.

Within the teachings of the present inventions, typical infeed configurations for six feet long nominal zones include:
3' Infeed idler with only an interface module 3' Infeed idler without any control module (slave)
6' Infeed idler with only an interface module
6' Infeed idler with a zone control module (two 3' zones)
9' Infeed idler with a zone control module (one 6' zone and one infeed 3' zone)
9' Infeed idler with a zone control module and an interface module (three 3' zones, with interface on the infeed)
12' Infeed idler with a zone control module (two 6' zones)
12' Infeed idler with a zone control module and an interface module (two 3' zones, with the interface on the infeed, then a 6' zone)

Within the teachings of the present inventions, typical discharge configurations for six feet long nominal zones include:
3' Discharge idler with only an interface module
3' Discharge idler without any control module (slave)
6' Discharge idler with only an interface module (6' release zone)
6' Discharge idler with zone control module (3' release zone)

Figure 6C:
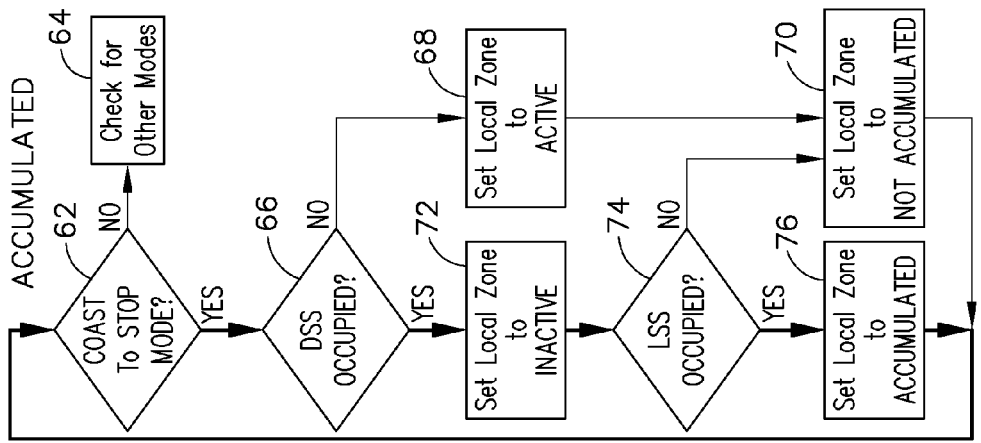
FIGS. 6A, 6B, 6C illustrate control logic for coast to stop accumulation mode.
Figure 6B:
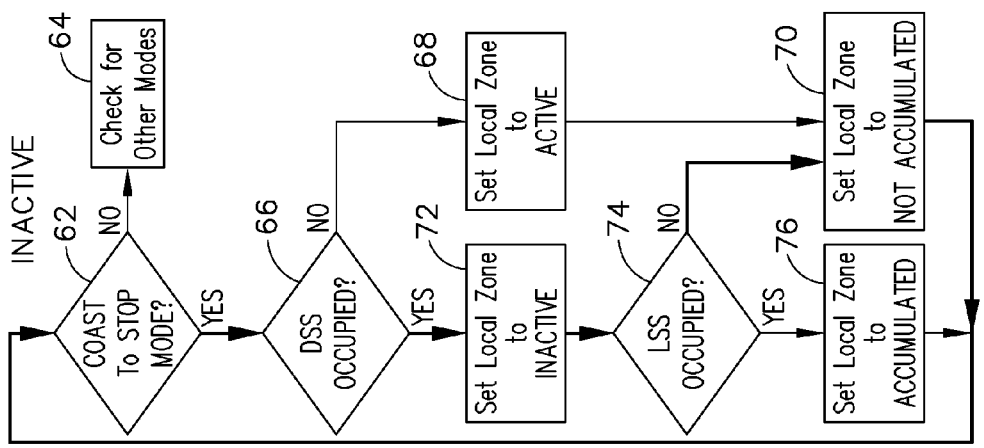
Figure 6A:
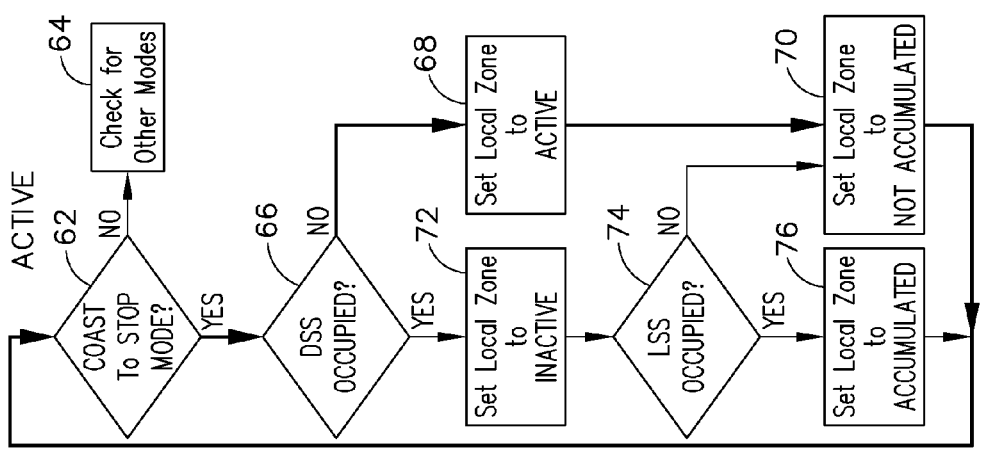

Referring to FIGS. 6A, 6B and 6C, each shows identical control logic representative of coast to stop accumulation mode, which is the least aggressive accumulation mode. The most downstream zone of the system, i.e., the discharge zone, will be inactive in the coast to stop mode unless there is a release command. The control logic is independently executed by each module for each zone controlled thereby. The differences between FIGS. 6A, 6B and 6C lie in the illustrated path followed in execution of the control logic. At step 62, it is determined whether the accumulation conveyor is in the coast to stop mode. If no, then the logic proceeds to step 64 whereat other accumulation modes are checked for. If the coast to stop mode is active, then the logic proceeds to step 66 which determines whether the downstream sensor is occupied.

As used herein, a sensor is considered occupied when the sensor has been blocked and a time delay period has expired. A sensor is considered not occupied when the sensor is clear (not blocked) and the time delay period has expired. The sensor time delay period is set by DIP switch position on the most downstream interface module. The time delay period set by DIP switches is applied to all modules in the string and their corresponding sensors. Although the time delay period for determining occupied could be different than the time delay period for determining clear, in one embodiment it is not. In one embodiment, DIP switches allowed the delay to be set at zero, 0.75 seconds, 1.0 seconds or 1.5 seconds.

If the downstream zone is not occupied, the control logic proceeds to step 68, as indicated by the heavy line in FIG. 6A. At step 68, the local zone (i.e., the zone being examined) is set to active, and the control logic proceeds to step 70 whereat the local zone is set to non accumulated. From there the control logic returns to step 62. As used herein, active means the conveyor or zone is moving.

If the downstream zone is occupied at step 66, the control logic proceeds to step 72 where the local zone is set to inactive. As used herein, inactive means the conveyor or zone is not moving. The control logic proceeds to step 74 where it is determined whether the local zone sensor is occupied. If it is not, then the logic proceeds to step 70, setting the local zone to not accumulated, a path indicated by the heavy line of FIG. 6B. As used herein, not accumulated means the particular zone is not active or it's zone sensor is clear. As used herein, a sensor is clear when the sensor's output is in a state consistent with seeing the reflector, meaning product is not being detected by the local zone sensor directly (without time delay—it is actual sensor state). If the local zone sensor is occupied at step 74, the control logic proceeds to step 76 whereat the local zone is set to accumulated, a path indicated by the heavy line of FIG. 6C. As used herein, accumulated means the local zone is inactive and the local zone sensor is blocked. As used herein, a sensor is blocked when the sensor's output is in a state consistent with not seeing the reflector meaning product is being detected by the local zone sensor directly (without time delay—it is actual sensor state).

Figure 7A:
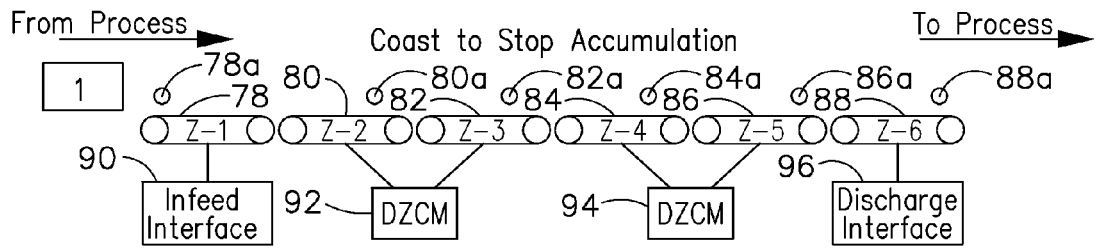
FIGS. 7A-7V are diagrammatic zones illustrating operation of an accumulation conveyor in coast to stop accumulation mode.
Figure 7B:
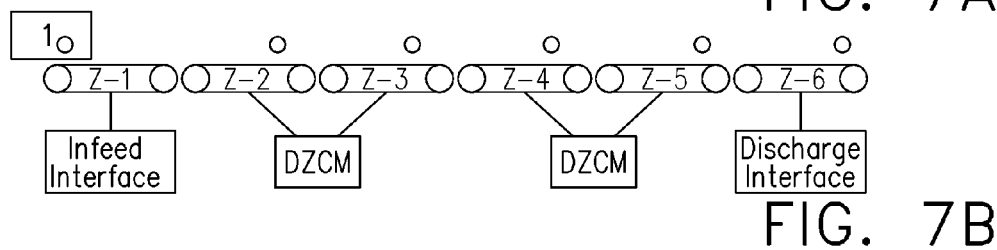
Figure 7C:
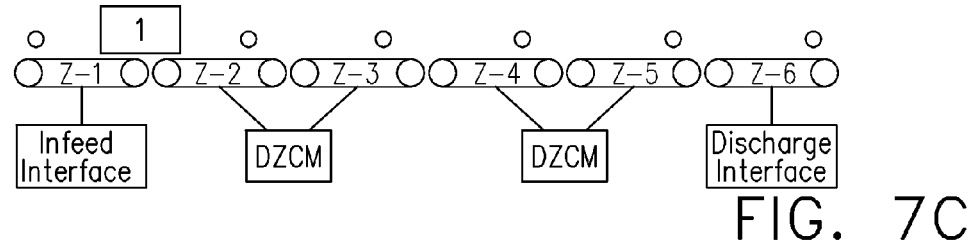
Figure 7D:
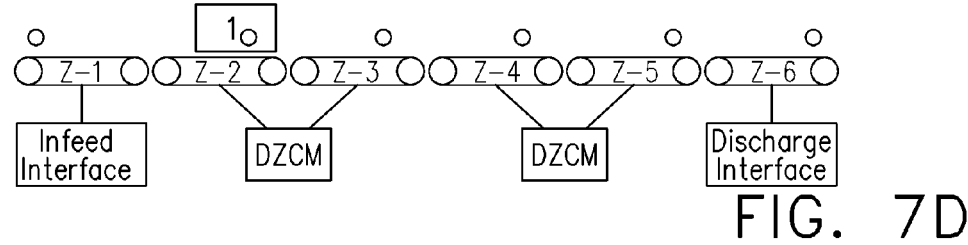
Figure 7E:
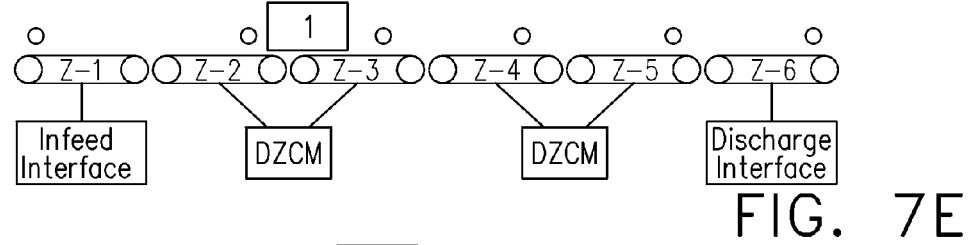
Figure 7F:
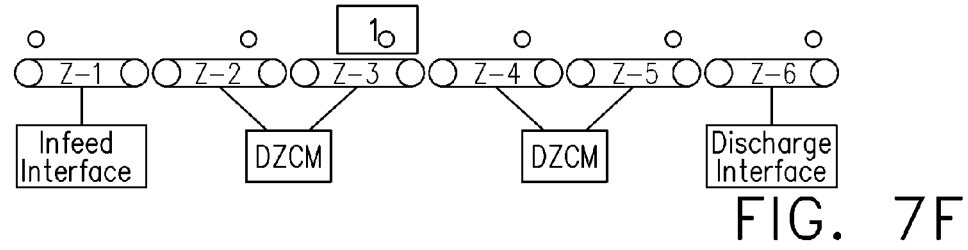
Figure 7G:
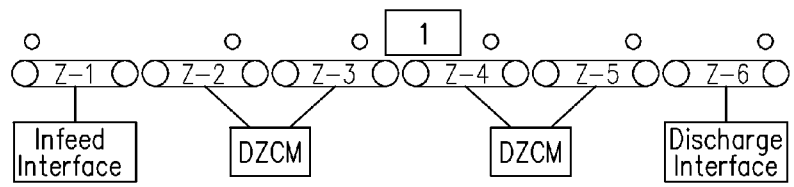
Figure 7H:
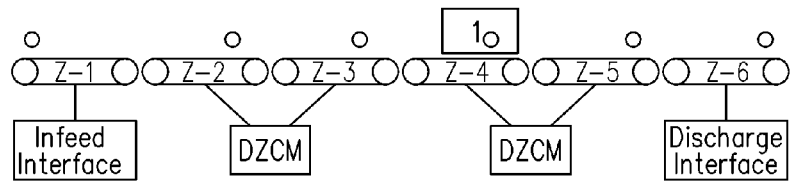
Figure 7I:
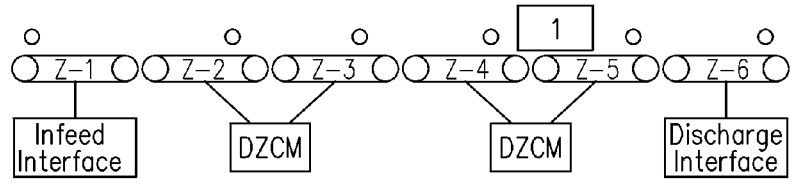
Figure 7J:
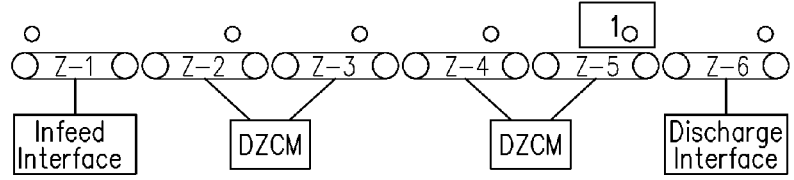
Figure 7K:
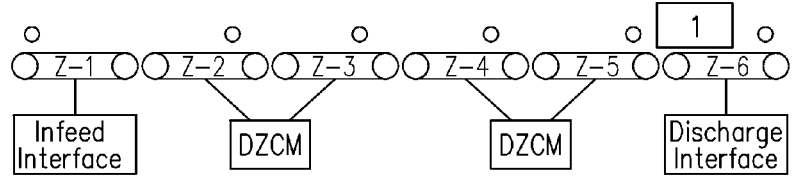
Figure 7L:
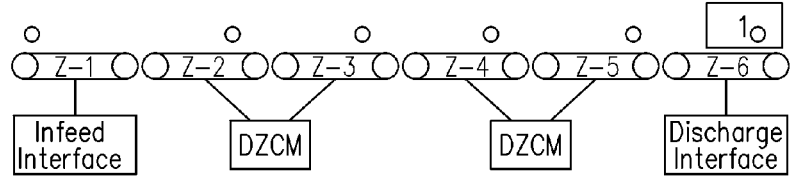
Figure 7M:
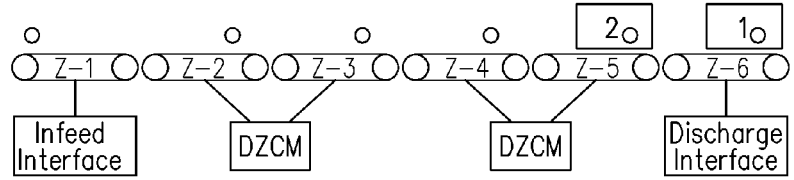
Figure 7N:
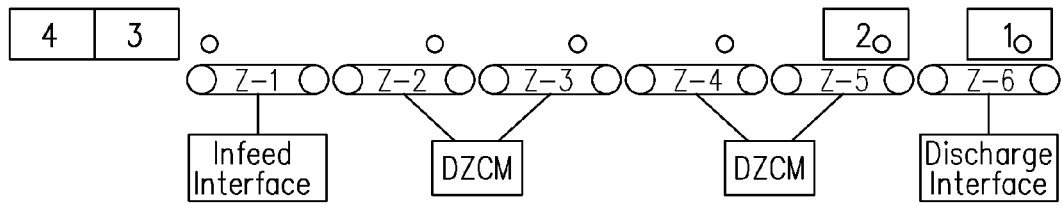
Figure 7O:
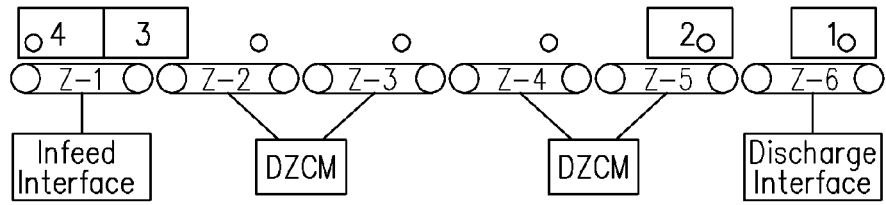
Figure 7P:
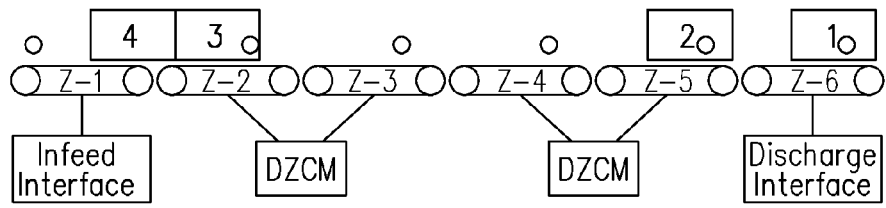
Figure 7Q:
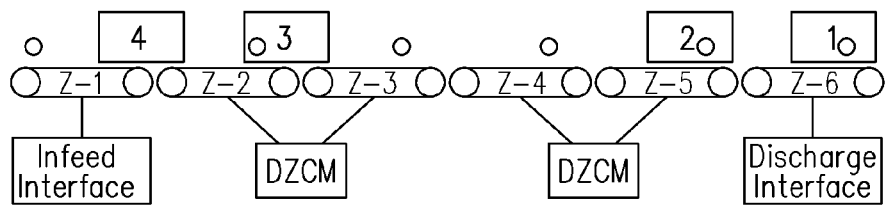
Figure 7R:
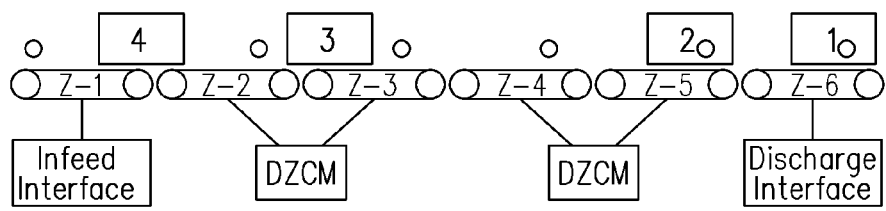
Figure 7S:
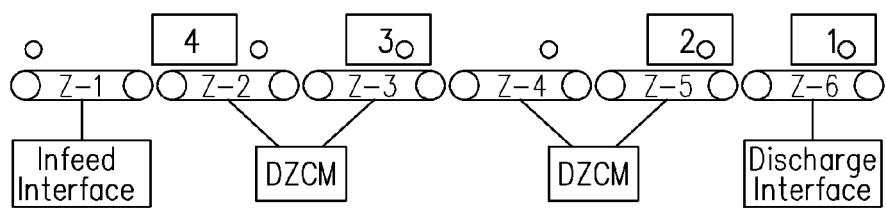
Figure 7T:
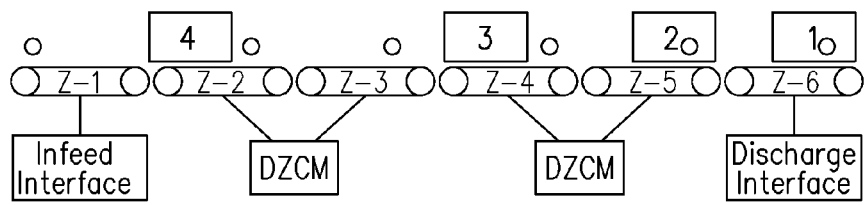
Figure 7U:
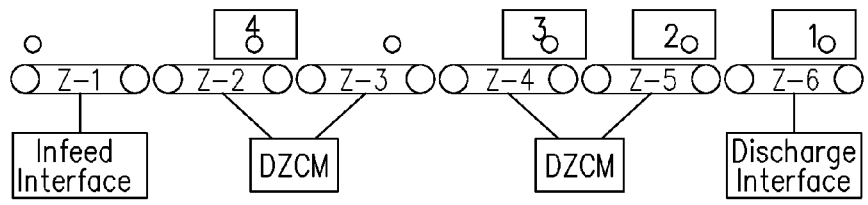
Figure 7V:
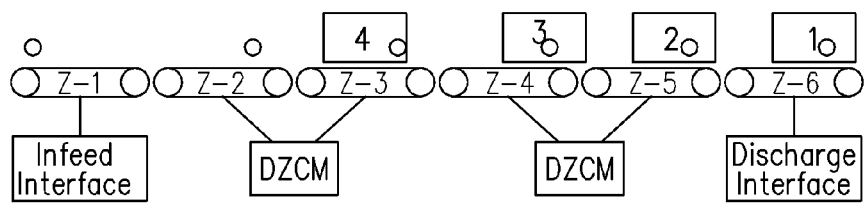

Referring to FIGS. 7A-7V, an example of the operation of the coast to stop accumulation control logic is illustrated in the series of figures. Each of FIGS. 7A-7V depicts zones 1-6 labeled in FIG. 7A only as 78, 80, 82, 84, 86 and 88, with sensors 78a, 80a, 82a, 84a, 86a and 88a respectively. Zone 1 is controlled by infeed interface module 90, zones 2 and 3 are controlled by zone control module 92, zones 4 and 5 are controlled by zone control module 94 and zone 6 is controlled by discharge interface module 96. As mentioned above, in the coast to stop accumulation mode, zone 6 is inactive until such time as a release command is received from an external system.

FIGS. 7A and 7B illustrate package 1 entering zone 1 and passing sensor 78a. FIG. 7C illustrates package 1 transferring to zone 2. In FIG. 7D, sensor 80a becomes occupied by package 1, stopping zone 1, while zone 2 remains active. At FIG. 7E, package 1 is transferring to zone 3, and zone 1 has become active again. At FIG. 7F, sensor 82a is occupied and zone 2 is stopped. FIG. 7G illustrates package 1 transferring to zone 4, with zone 2 active since sensor 82a is not occupied. At FIG. 7H, sensor 84a is occupied by package 1, stopping zone 3. FIG. 7I shows package 1 transferring to zone 5, with sensor 84a becoming unoccupied, and zone 3 starting. FIG. 7J illustrates sensor 86a becoming occupied by package 1, stopping zone 4. FIG. 7K shows package 1 transferring to zone 6, unoccupying sensor 86a and zone 4 starting. FIG. 7L illustrates package 1 coasting to a stop, since zone 6 is inactive, and causing sensor 88a to become occupied, thereby stopping zone 5.

FIG. 7M illustrates package 2 progressed down the conveyor much the same as did package 1, having coasted to a stop to block photo eye 86a of zone 5, thereby deactivating zone 4. FIG. 7N show packages 3 and 4 entering the accumulation conveyor pressing against each other. Referring to FIG. 7O, sensor 78a of zone 1 becomes occupied but no conveyor zones are thereby affected. FIG. 7P illustrates sensor 80a of zone 2 just becoming occupied by package 3, causing zone 1 to stop being driven, holding up package 4. FIG. 7Q illustrated a gap formed between packages 3 and 4 as package 3 continues to move past sensor 80a. In FIG. 7R, sensor 80a has become unoccupied, with zone 1 starting up and moving package 4. AT FIG. 7S, sensor 82a of zone 3 is occupied by package 3, stopping zone 2, making the gap between packages 3 and 4 bigger. FIG. 7T illustrates package 3 transferred to zone 4, which is stopped as a result of sensor 86a of zone 5 being blocked by package 2. In FIG. 7T, sensor 82a is unoccupied, restarting zone 2 and moving package 4 forward.

FIG. 7U illustrates that package 3 has coasted to a stop, occupying sensor 84a, resulting in zone 3 becoming inactive. Thus, when package 4 reaches zone 3 as shown in FIG. 7V, package 4 coasts to stop blocking photo eye 82a and causing zone 2 to be inactive.

Figure 8C:
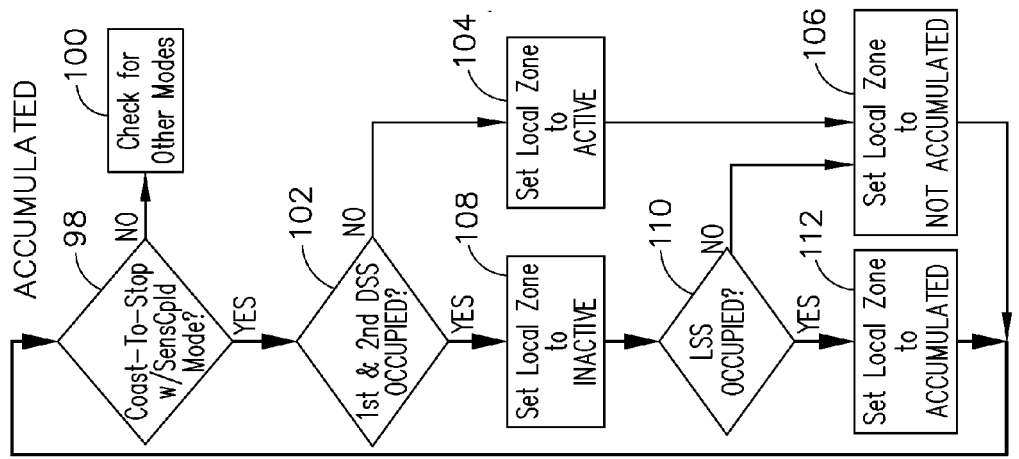
FIGS. 8A, 8B, 8C illustrate control logic for coast to stop with sensor coupled accumulation mode
Figure 8B:
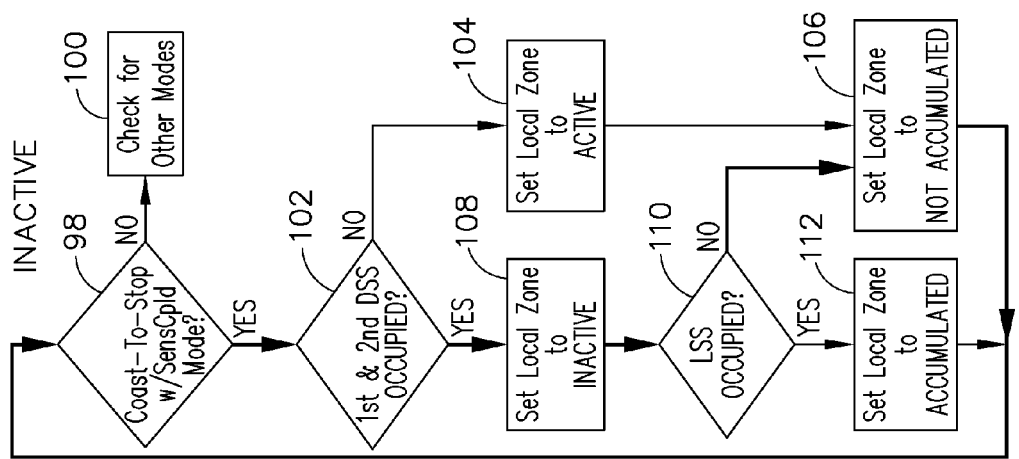
Figure 8A:
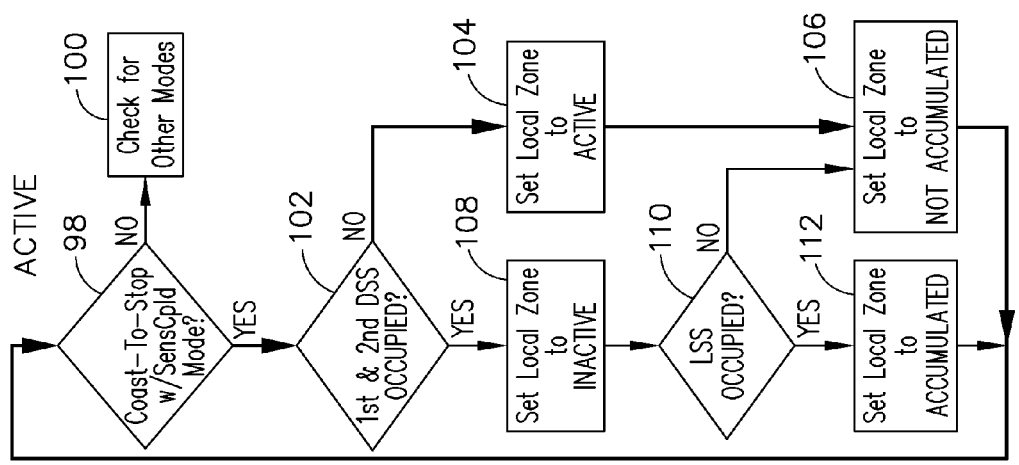

Referring to FIGS. 8A, 8B and 8C, each shows identical control logic representative of coast to stop with sensor coupled accumulation mode. The most downstream zone of the system, i.e., the discharge zone, will be inactive unless there is a release command. The second most downstream zone will use simple coast to stop logic. The control logic is independently executed by each module for each zone controlled thereby. The differences between FIGS. 8A, 8B and 8C lie in the illustrated path followed in execution of the control logic.

At step 98, it is determined whether the accumulation conveyor is in the coast to stop with sensor coupled mode. If no, then the logic proceeds to step 100 whereat other accumulation modes are checked for. If the coast to stop with sensor coupled mode is active, then the logic proceeds to step 102 which determines whether sensors of the two downstream zones are both occupied. If the two downstream zone sensors are not both occupied, the control logic proceeds to step 104, as indicated by the heavy line in FIG. 8A. At step 104, the local zone (i.e., the zone being examined) is set to active, and the control logic proceeds to step 106 whereat the local zone is set to non accumulated. From there the control logic returns to step 98.

If the two downstream zones sensors are occupied at step 102, the control logic proceeds to step 108 where the local zone is set to inactive. The control logic proceeds to step 110 where it is determined whether the local zone sensor is occupied. If it is not, then the logic proceeds to step 106, setting the local zone to not accumulated, a path indicated by the heavy line of FIG. 8B. If the local zone sensor is occupied at step 110, the control logic proceeds to step 112 whereat the local zone is set to accumulated, a path indicated by the heavy line of FIG. 8C.

Referring to FIGS. 9A-9L, an example of the operation of the coast to stop sensor coupled accumulation mode control logic is illustrated in the series of figures. Each of FIGS. 9A-9L depicts zones 1-6 labeled in FIG. 9A only as 114, 116, 118, 120, 122 and 124, with sensors 114a, 116a, 118a, 120a, 122a and 124a respectively. Zone 1 is controlled by infeed interface module 126, zones 2 and 3 are controlled by zone control module 128, zones 4 and 5 are controlled by zone control module 130 and zone 6 is controlled by discharge interface module 132. As mentioned above, in the coast to stop—sensor coupled accumulation mode, zones 5 and 6 are inactive until such time as a release command is received from an external system.

Figure 9G:
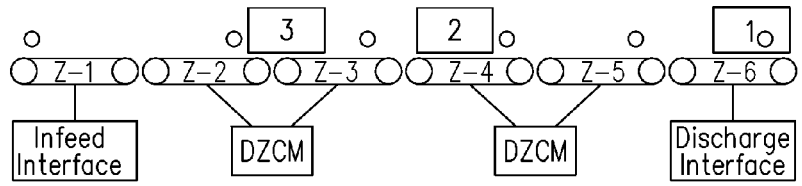

In FIG. 9A, package 1 has progressed and coasted to a stop occupying sensor 124a. Packages 2 and 3 are arriving with a gap therebetween. In FIG. 9B, package 2 is occupying sensor 114a, but no zones are made inactive. At FIG. 9C, package 2 is transferring to zone 2 as package 3 enters zone 1. At FIG. 9D, package 2 is occupying sensor 116a, but zone 1 remains active since sensor 118a of zone 3 is not occupied. Package 3 is occupying sensor 114a. FIG. 9E illustrates packages 2 and 3 transferring to the next sequential zone. In FIG. 9F, package 2 is occupying sensor 118a of zone 3, and package 3 is occupying sensor 116a of zone 2, which results in zone 1 being stopped, with no effect in the example illustrated. FIG. 9G illustrates packages 2 and 3 transferring to zones 4 and 3 respectively, unoccupying the sensors, and resulting in zone 1 becoming active.

Figure 9H:
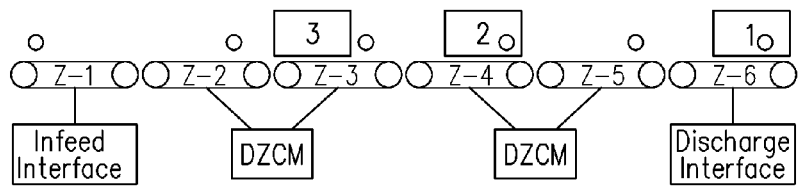
Figure 9I:
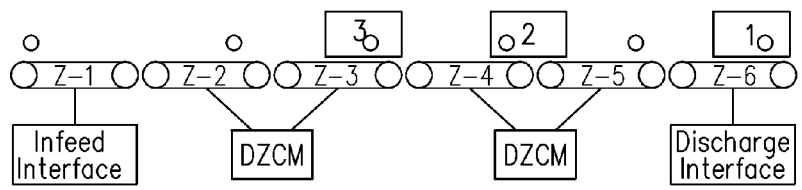
Figure 9J:
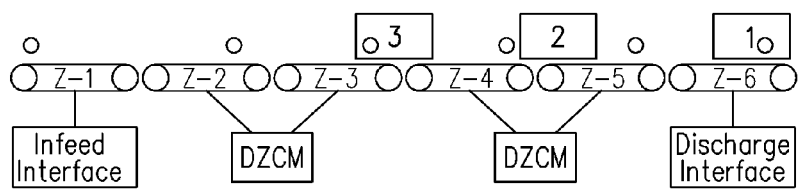
Figure 9K:
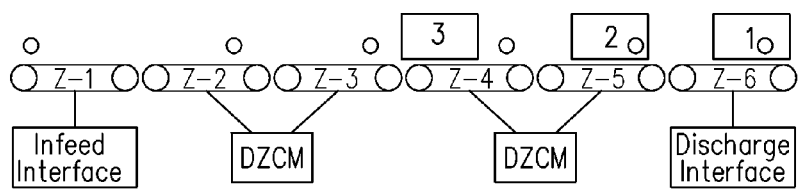
Figure 9L:
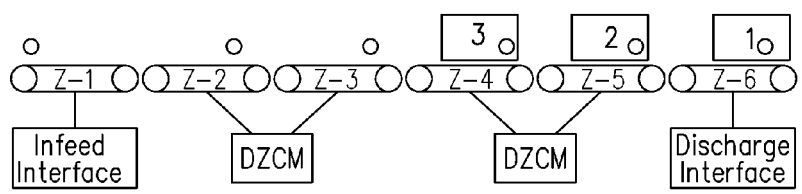

FIG. 9H illustrates package 2 occupying sensor 120a with no affect on accumulation. FIG. 9I illustrates packages 2 and 3 occupying sensors 120a and 118a, respectively, deactivating zone 2. Package 2 is transferring to zone 5 which is inactive. FIG. 9J illustrates package 2 having progressed far enough to unoccupy sensor 120a of zone 4 as it transfers to inactive zone 5, allowing zone 2 to become active. FIG. 9K illustrates package 2 coasted to a stop in zone 5, occupying sensor 122a. With photo eye 124a blocked by package 1 and photo eye 122a blocked by package 2, zone 3 is made inactive, causing package 3 to coast in zone 4. FIG. 9L illustrates no further movement of packages 1 and 2, and package 3 having coasted to a stop occupying sensor 120*a*, thereby resulting in unoccupied zone 3 being active.

Figure 10C:
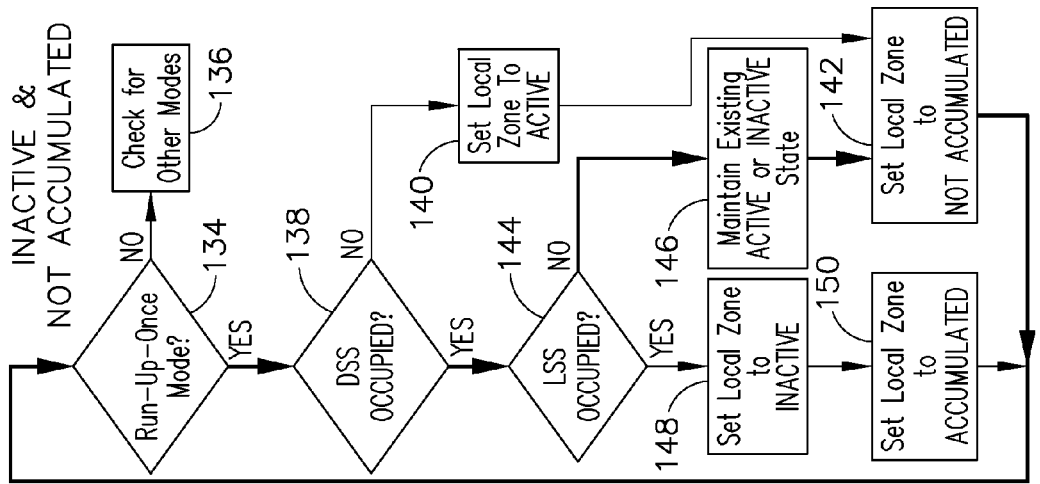
FIGS. 10A, 10B, 10C illustrate control logic for run up once accumulation mode.
Figure 10B:
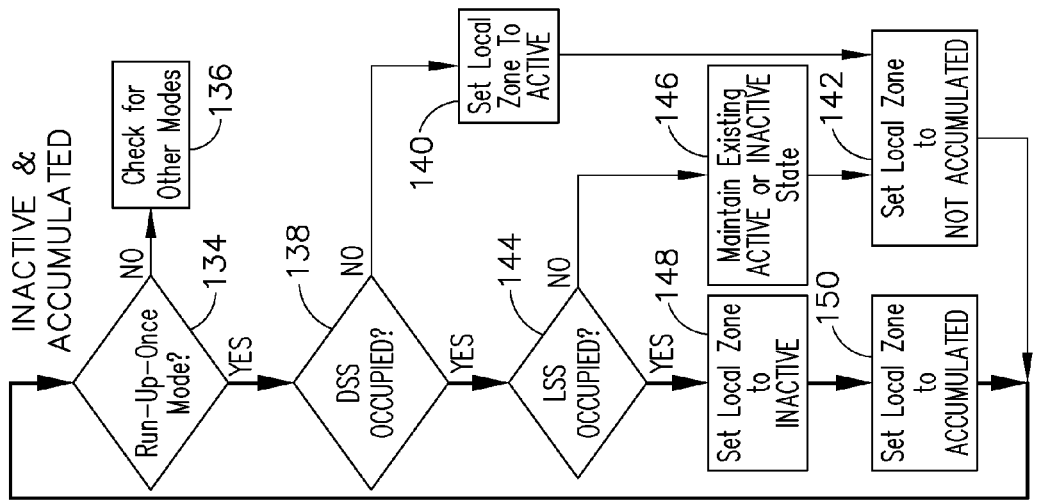
Figure 10A:
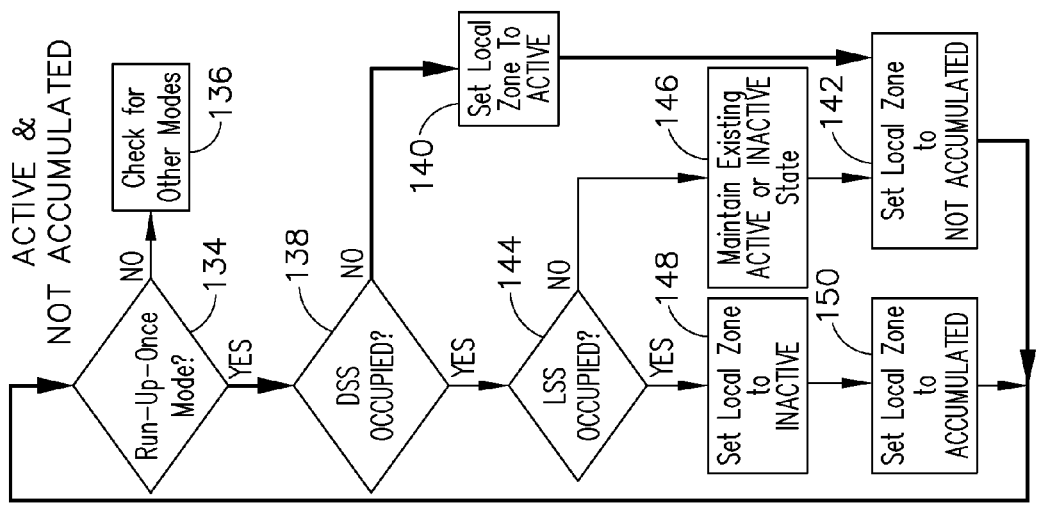

The run up once accumulation mode compensates for the longer coast-to-stop buffers between sensors when using zones longer than three feet operated in a cost to stop manner where there is no braking force applied to stop cartons. This control strategy is implemented by allowing packages in a local zone to be driven all the way to the sensor in that zone, i.e., run up to the local zone sensor, before canceling the drive in that zone. Referring to FIGS. 10A, 10B and 10C, each shows identical control logic representative of run up once accumulation mode. The most downstream zone of the system, i.e., the discharge zone, will be inactive in the run up once mode unless there is a release command is received from an external system. The control logic is independently executed by each module for each zone controlled thereby. The differences between FIGS. 10A, 10B and 10C lie in the illustrated path followed in execution of the control logic.

At step 134, it is determined whether the accumulation conveyor is in the run up once mode. If no, then the logic proceeds to step 136 whereat other accumulation modes are checked for. If the run up once mode is active, then the logic proceeds to step 138 which determines whether the sensor of the immediately downstream zone is occupied. If the downstream zone sensor is not occupied, the control logic proceeds to step 140, as indicated by the heavy line in FIG. 10A. At step 140, the local zone (i.e., the zone being examined) is set to active, and the control logic proceeds to step 142 whereat the local zone is set to non accumulated. From there the control logic returns to step 134.

If the downstream zone sensor is occupied at step 138, the control logic proceeds to step 144, as indicated by the heavy lines in FIG. 10C, where it is determined whether the local zone sensor is occupied. If it is not, the logic proceeds to step 146 whereat the state of the local zone is latched, i.e., maintained in its current inactive or active state. The control logic proceeds to step 142, setting the local zone to not accumulated, and proceeds back to step 134. If the local zone sensor is occupied at step 144, the logic proceeds to step 148 whereat the local zone is set to inactive and then to step 150 whereat the local zone is set to accumulated.

Referring to FIGS. 11A-11I, an example of the operation of the run up once accumulation mode control logic is illustrated in the series of figures. Each of FIGS. 11A-11I depicts zones 1-6 labeled in FIG. 11A only as 152, 154, 156, 158, 160 and 162, with sensors 152*a*, 154*a*, 156*a*, 158*a*, 160*a* and 162*a* respectively. Zone 1 is controlled by infeed interface module 164, zones 2 and 3 are controlled by zone control module 166, zones 4 and 5 are controlled by zone control module 168 and zone 6 is controlled by discharge interface module 170. As mentioned above, in the run up once accumulation mode, zone 6 is inactive until such time as a release command is received from an external system.

Figure 11A:
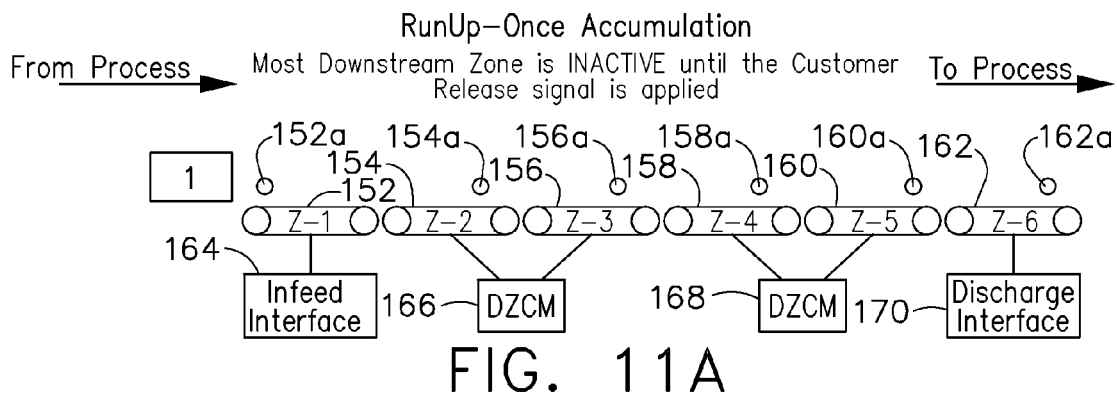
FIGS. 11A-11I are diagrammatic zones illustrating operation of an accumulation conveyor in run up once accumulation mode.
Figure 11B:
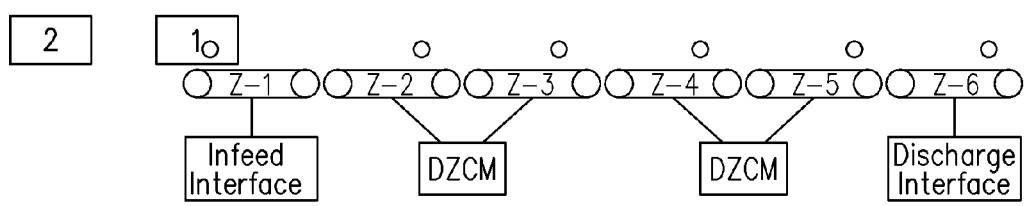
Figure 11C:
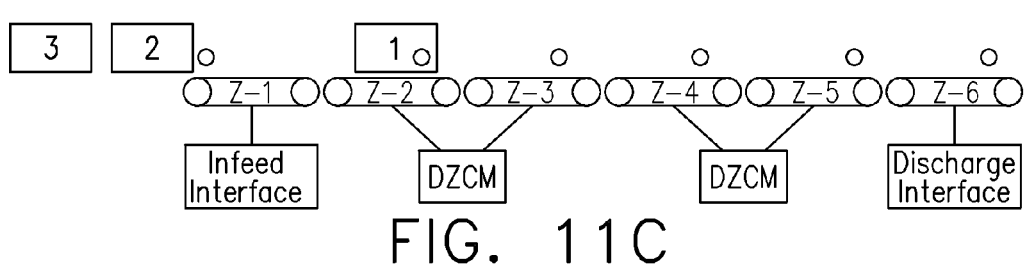
Figure 11D:
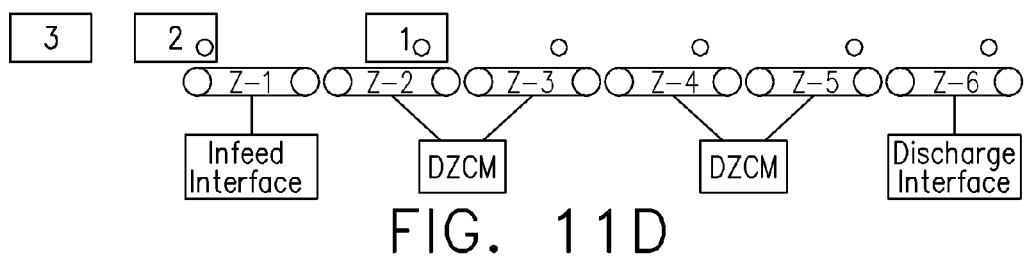
Figure 11E:
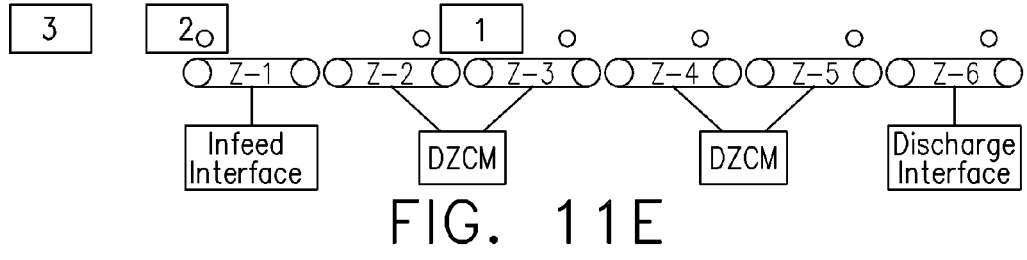
Figure 11F:
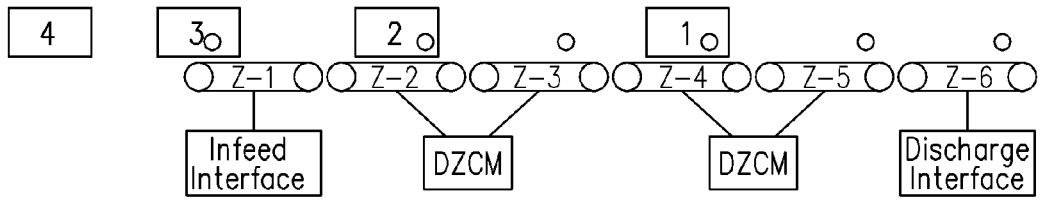
Figure 11G:
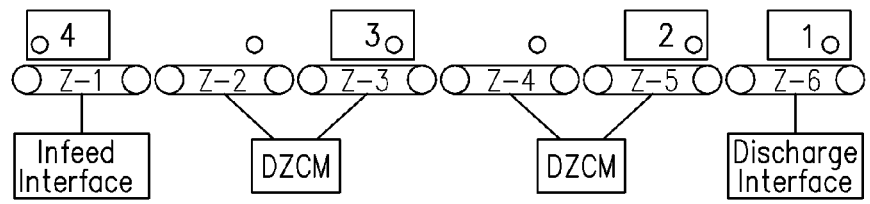

FIGS. 11A and 11B illustrate package 1 entering zone 1 and occupying sensor 152*a*. FIG. 11C illustrates package 1 occupying sensor 154*a* of zone 2, as package 2 enters zone 1, with zone 1 still active. FIG. 11D illustrates package 1 advanced a little further than shown in FIG. 11C, but still occupying sensor 154*a*. Package 2 is occupying sensor 152*a*. Under the run up once control logic, zone 2, the downstream zone to zone 1, is occupied so the state of the local zone sensor 152*a* is checked. Since it is occupied by Package 2, the control logic sets the local zone, zone 1 to inactive and accumulated. In FIG. 11E, package 1 has passed sensor 154*a*, so zone 1 goes active. In FIG. 11F, package 2 is occupying sensor 152*a* and package 3 is occupying sensor 152*a*, resulting in zone 1 being deactivated, keeping package 3 in zone 1 until package 2 clears sensor 154*a*. FIG. 11G illustrates package 1 as reaching zone 6, occupying sensor 162*a*, and package 2 reaching zone 5 occupying sensor 160*a*. With zone 5's downstream sensor (sensor 162*a* of zone 6) and zone 5's sensor 160*a* occupied, zone 5 is deactivated. Zone 5 will remain deactivated (latched) until sensor 162*a* of zone 6 clears.

Figure 11H:
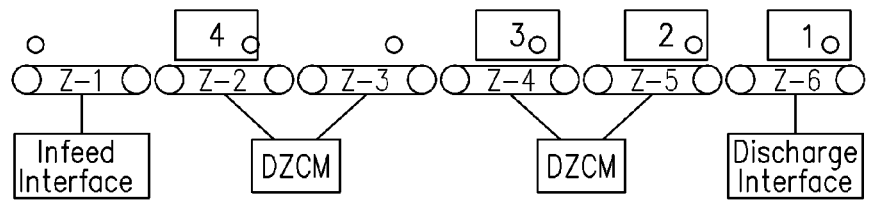
Figure 11I:
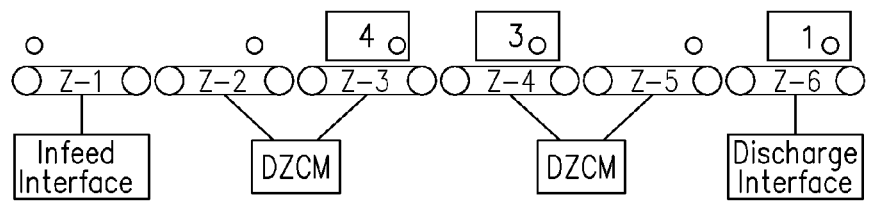

In FIG. 11H, package 3 is occupying sensor 158*a* of zone 4, which with sensor 160*a* of zone 5 being blocked, zone 4 is latched off until sensor 160*a* of zone 5 is cleared. Package 4 is occupying sensor 154*a*. FIG. 11I illustrates the removal of package 2 from the conveyor. Zone 5 will remain latched until zone 6 becomes clear. However, zone 4 will become active (unlatched) since sensor 160*a* of zone 5 became unoccupied, moving package 3 into zone 5. In doing so, photo eye 158*a* of zone 4 will become clear, unlatching zone 3 thereby advancing package 4.

Figure 12C:
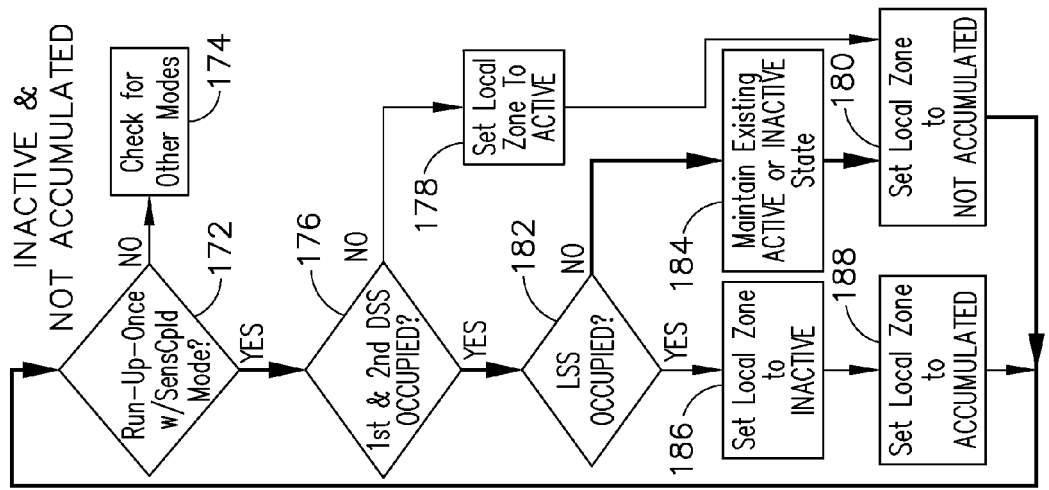
FIGS. 12A, 12B, 12C illustrate control logic for run up once with sensor coupled accumulation mode.
Figure 12B:
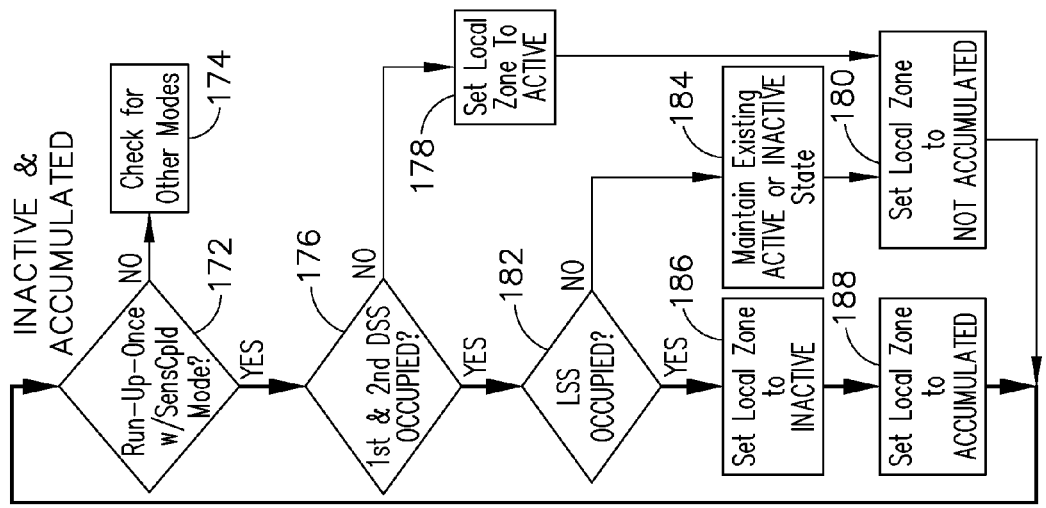
Figure 12A:
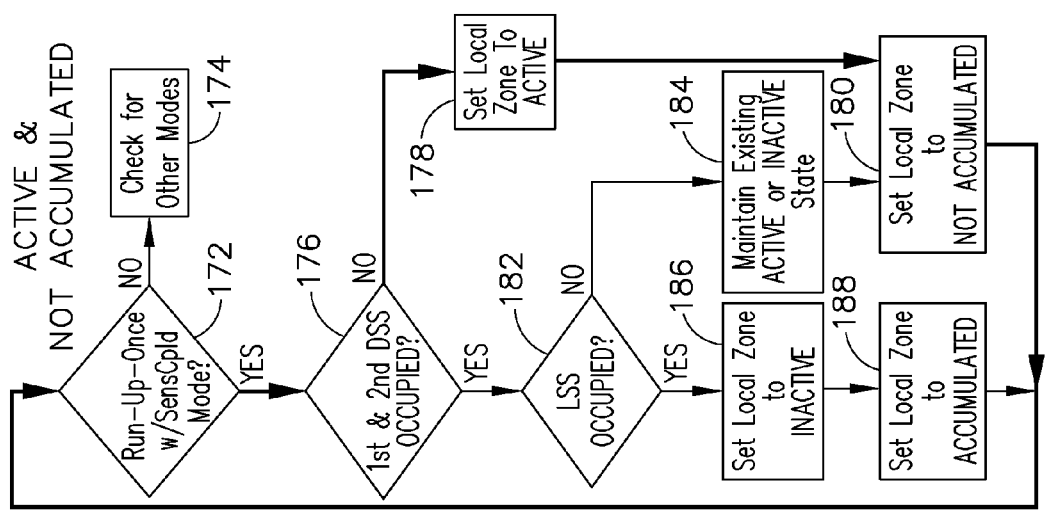

Referring to FIGS. 12A, 12B and 12C, each shows identical control logic representative of run up once with sensor coupled accumulation mode. The most downstream zone of the system, i.e., the discharge zone, will be inactive in the run up once with sensor coupled mode unless there is a release command. The second most downstream zone will use simple coast to stop logic. The control logic is independently executed by each module for each zone controlled thereby. The differences between FIGS. 12A, 12B and 12C lie in the illustrated path followed in execution of the control logic.

At step 172, it is determined whether the accumulation conveyor is in the run up once with sensor coupled mode. If no, then the logic proceeds to step 174 whereat other accumulation modes are checked for. If the run up once with sensor coupled mode is active, then the logic proceeds to step 176 which determines whether sensors of the two downstream zones are both occupied. If the two downstream zone sensors are not occupied, the control logic proceeds to step 178, as indicated by the heavy line in FIG. 12A. At step 178, the local zone (i.e., the zone being examined) is set to active, and the control logic proceeds to step 180 whereat the local zone is set to non accumulated. From there the control logic returns to step 172.

If the two downstream zone sensors are occupied at step 176, the control logic proceeds to step 182, where it is determined whether the local zone sensor is occupied. If it is not, the logic proceeds to step 184, as indicated by the heavy line in FIG. 12C, whereat the state of the local zone is latched, i.e., maintained in its current inactive or active state. The control logic proceeds to step 180, setting the local zone to not accumulated, and proceeds back to step 172. If the local zone sensor is occupied at step 182, the logic proceeds to step 186 whereat the local zone is set to inactive and then proceeds to step 188 whereat the local zone is set to accumulated.

Referring to FIGS. 13A-13G, an example of the operation of the run up once with sensor coupled accumulation mode control logic is illustrated in the series of figures. Each of FIGS. 13A-13G depicts zones 1-6 labeled in FIG. 13A only as 190, 192, 194, 196, 198 and 200, with sensors 190*a*, 192*a*, 194*a*, 196*a*, 198*a* and 200*a* respectively. Zone 1 is controlled by infeed interface module 202, zones 2 and 3 are controlled by zone control module 204, zones 4 and 5 are controlled by zone control module 206 and zone 6 is controlled by discharge interface module 208. As mentioned above, in the run up once accumulation mode, zone 6 is inactive until such time as a release command is received from an external system.

Figure 13A:
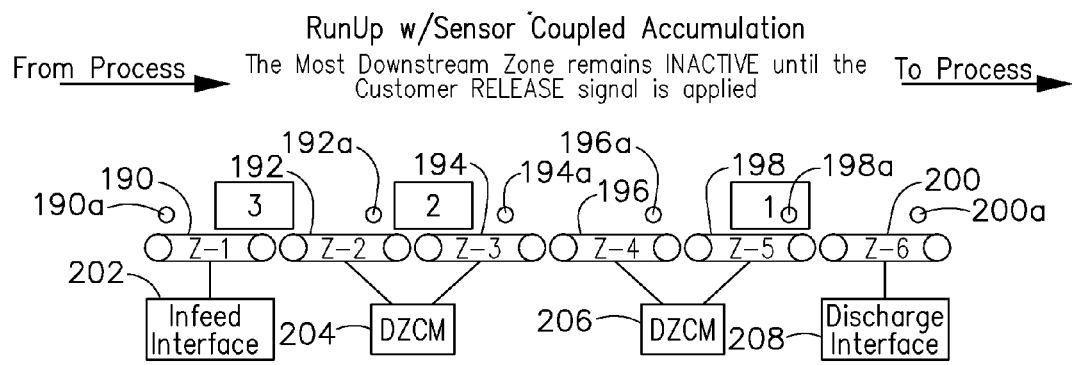
FIGS. 13A-13G are diagrammatic zones illustrating operation of an accumulation conveyor in run up once with sensor coupled accumulation mode.
Figure 13B:
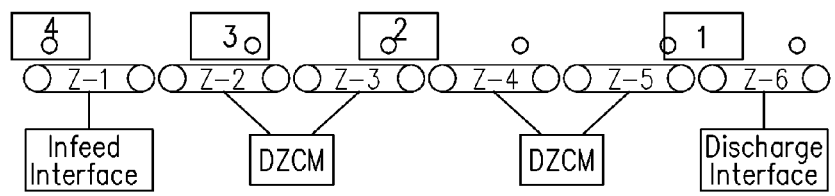
Figure 13C:
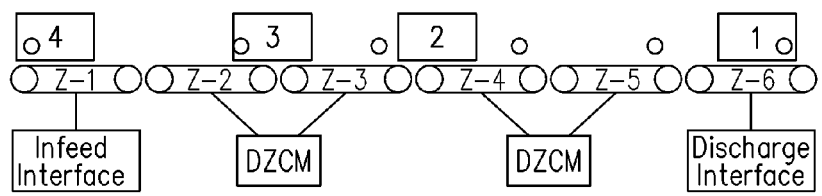
Figure 13D:
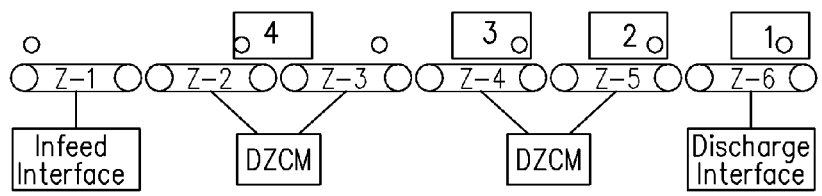
Figure 13E:
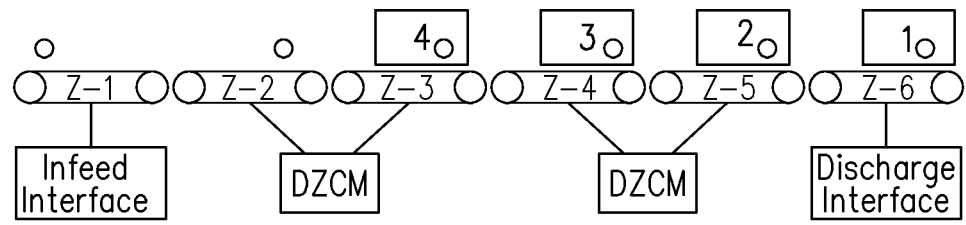

FIG. 13A illustrates packages 1, 2 and 3 on the accumulation conveyor. Package 1 is occupying sensor 198*a* of zone 5, and zones 1-5 are active, with zone 6 being inactive. At FIG. 13B, package 1 is transferring onto inactive zone 6, and packages 2 and 3 are occupying sensors 194a and 192a of zones 3 and 2 respectively. With package 4 occupying sensor 190a, zone 1 is set to inactive. In FIG. 13C, package 2 is no longer occupying sensor 194a, so zone 1 has been set to active. FIG. 13D illustrates package 2 occupying sensor 198a of zone 5. Zone 5 being the second most downstream zone following the run up once control logic, with the immediate downstream sensor 200a occupied, and the zone 5 sensor occupied, zone 5 is set to inactive. In FIG. 13E, zones 3 and 4 are inactive as a result of those zones being occupied and their respective downstream two zones being occupied.

Figure 13F:
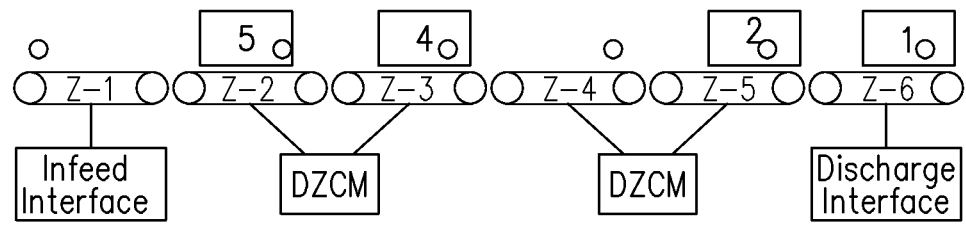
Figure 13G:
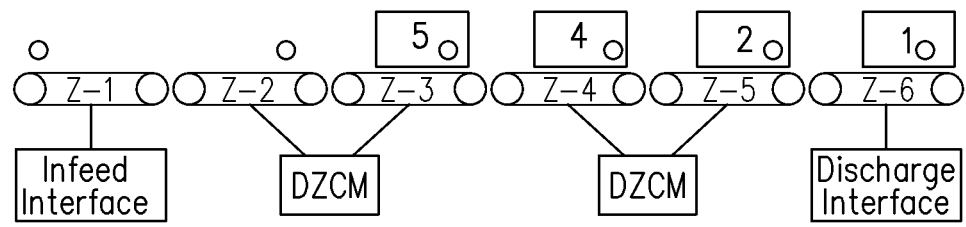

FIG. 13F depicts the removal of package 3 from the accumulation conveyor. Zone 4 remains inactive even though sensor 196a is clear because zone 4 is latched as a result of the two downstream sensors 198a and 200a being occupied. Zone 3 has became active as a result of sensor 196a not being occupied. FIG. 13G illustrates package 4 advanced to occupy sensor 196a of zone 4, resulting in zone 4 becoming inactive and latched because sensors 198a and 200a are occupied, and package 5 advanced to occupy sensor 194a of zone 3, resulting in zone 3 becoming inactive and latched because sensors 196a and 198a are occupied.

An aspect of the present invention that may be incorporated is zone crowding which is a control strategy designed to optimize usage of an accumulation conveyor. It is common for an accumulated conveyor to still have significant gaps between packages. This is especially true when using extended length zones. The zone crowding control logic functions to reduce gaps between packages after a local zone has been determined to be accumulated.

Figure 14:
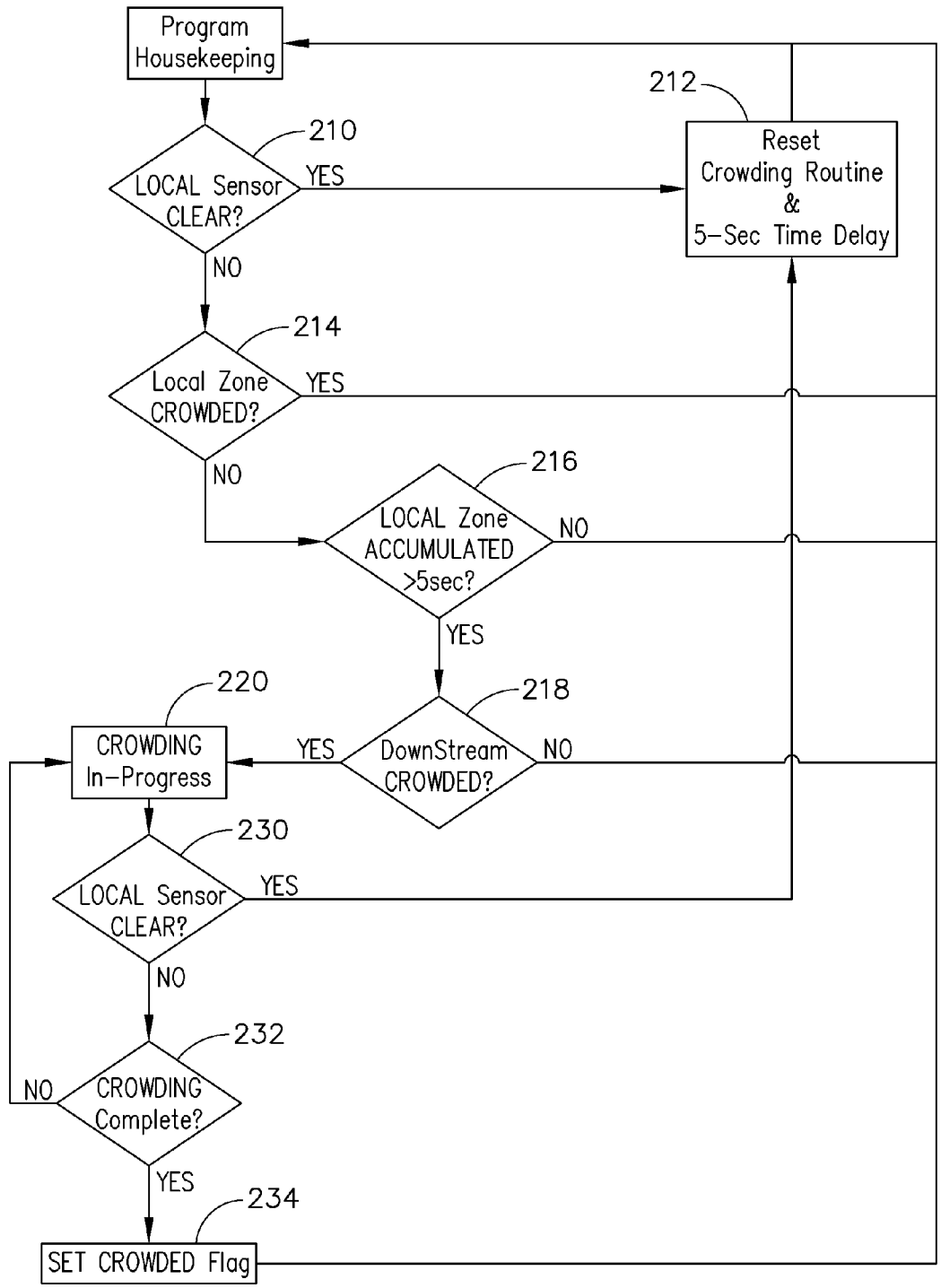
FIG. 14 illustrates control logic for crowding.

Physical crowding is effected through conveyor pulsations implemented through a crowding control algorithm, such as that shown in FIG. 14. The crowding control logic is executed for each local zone, being initiated if the immediate downstream zone has been crowded for a period of time and the local zone has been accumulated for a period of time. In one embodiment the period of time is five seconds.

Figure 15:
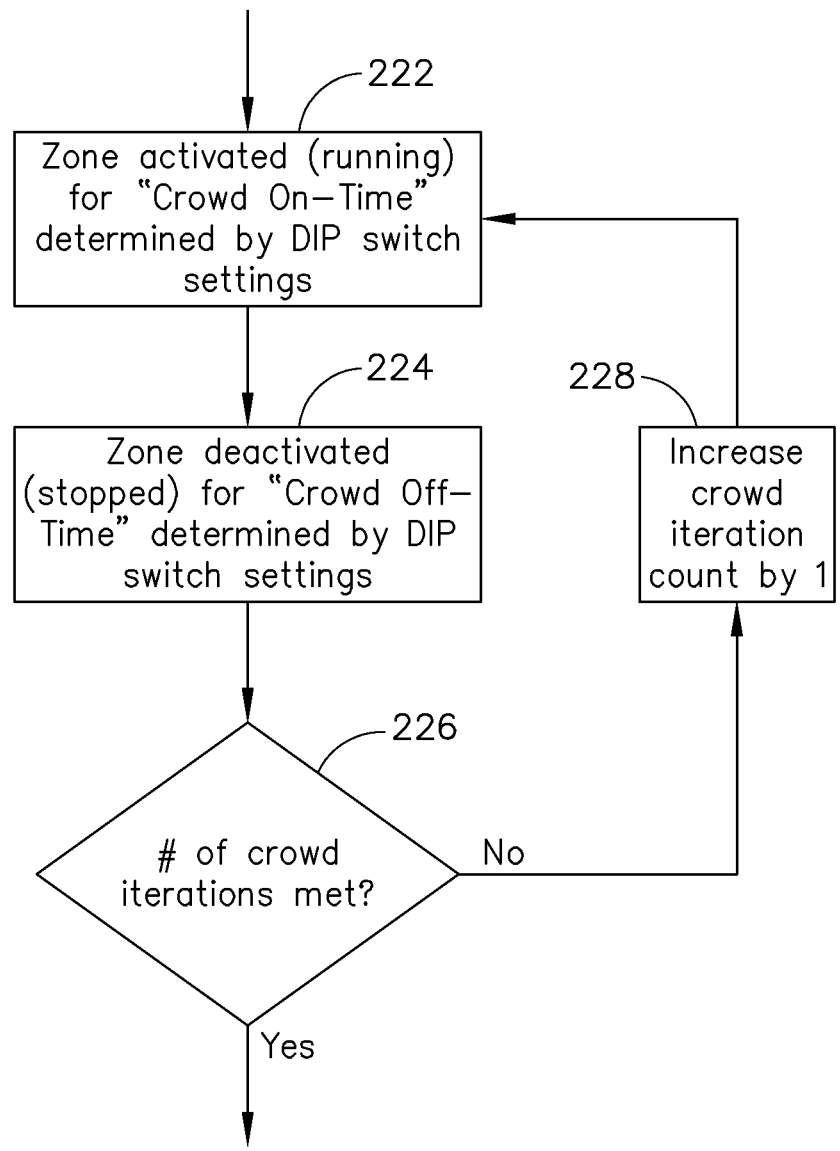
FIG. 15 illustrates control logic steps of the control logic illustrated in FIG. 14.

Referring to FIG. 14, the crowding logic determines at step 210 whether the local sensor is clear. If it is clear, the zone is not accumulated, and the crowding routine and five second delay are reset at step 212. If the local sensor is not clear, the control proceeds to step 214 to determine whether the local zone is already designated as crowded. If it is, the control logic returns to the program housekeeping. If the local zone is not yet crowded, the logic proceeds to step 216 and determines whether the local zone has been designated as accumulated for more than five seconds. If it has not, the crowding program will return to the program housekeeping. If the local zone has been accumulated for more than five seconds, the control logic determines whether the downstream zone is crowded at step 218. If it is not, the control logic will return to the program housekeeping. If the downstream zone is crowded, then the control logic will initiate the physical crowding of the routine at step 220. Referring to FIG. 15, there is shown the steps of step 220, starting at 222 with activating the zone for a crowd-on-time period as determined by DIP switch settings. The local zone is next deactivated at step 224 for a crowd-off-time, also determined by DIP switch settings. Steps 226 and 228 increment and compare the number of iterations executed and once the number of iterations meet a desired or defined number, the control logic returns to step 230 shown in FIG. 14 where the logic determines whether the local sensor is clear. If it is, the crowding routine and time delay is reset at 212. If not, the control continues to step 232 and checks if crowding is complete. If it is not, the control returns to the crowding in progress step 220. If crowding is complete the local zone crowded flag is set at step 234.

Figure 16:
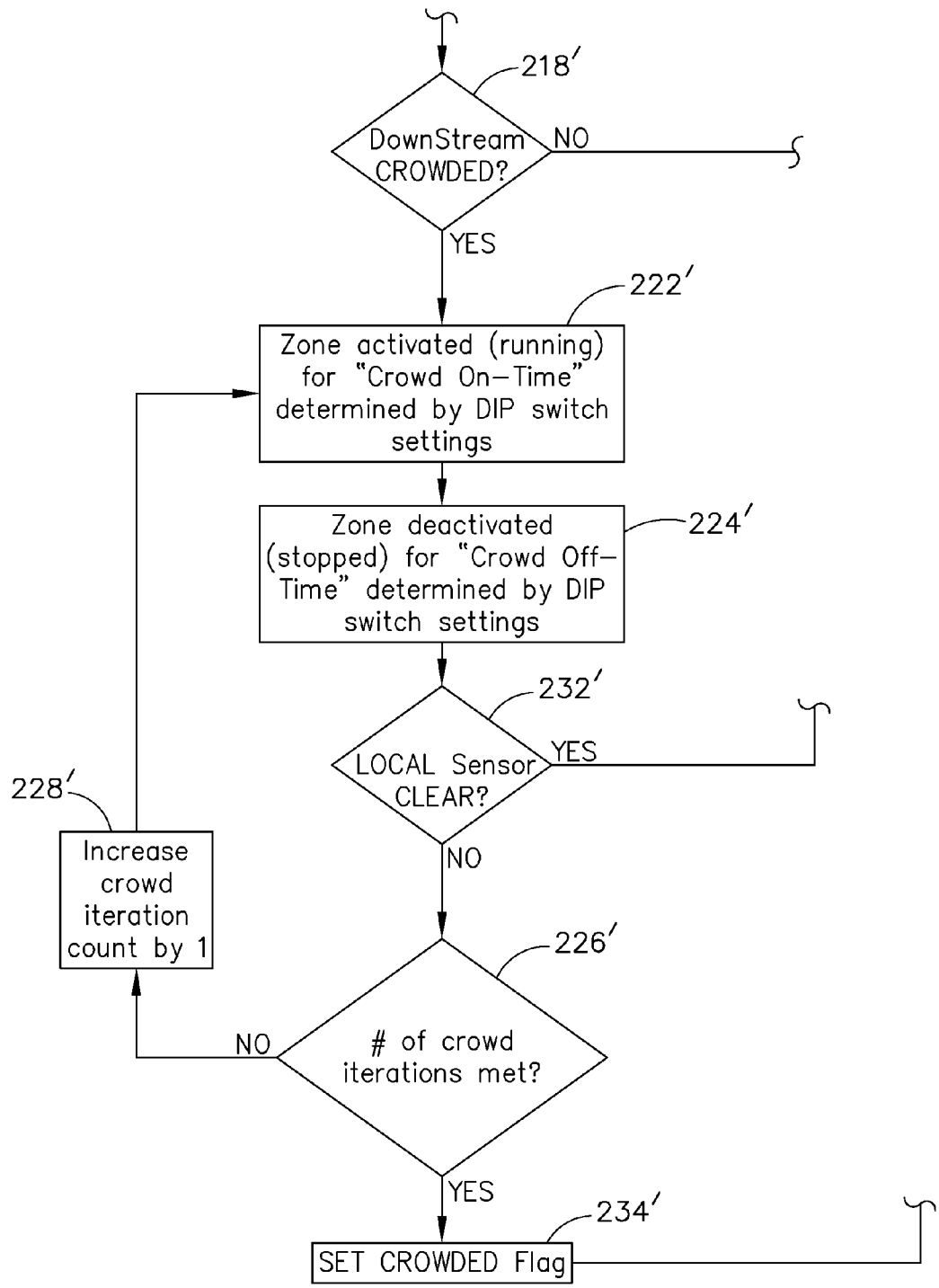
FIG. 16 illustrates an alternate embodiment of a portion of the control logic illustrated in FIGS. 14 and 15.

Referring to FIG. 16, there is shown an alternate embodiment of a portion of the control logic illustrated in FIGS. 14 and 15. The numbering of the steps in FIG. 16 correspond to the numbering of the corresponding steps in FIGS. 14 and 15, with the addition of ' to each number. The steps in FIG. 16 that have truncated lead lines connect to the corresponding steps found in FIGS. 14 and 15.

In one embodiment, the DIP switch settings were configured to select between the following crowd-on-time/crowd-off-time/number of iterations: 0/not applicable/0; 0.400 secs/2.0 secs/3 iterations; 0.550 secs/2.5 secs/3 iterations; and 0.700 secs/3.0 secs/3 iterations. The crowd-on-time must be long enough to be effective—it must be long enough to achieve the conveyor speed sufficient to deliver the desired surge. Other considerations include desired carton density and collision tolerance of the cartons. The crowd-off-time is selected to be long enough to allow the conveyor to stop. A high crowd-off-time would be required in conjunction with a high crowd-on-time.

Crowding does not have to be implemented on a global basis, and some zones may have the crowding routine disabled, set by the position of a DIP switch. Any zone or control module with crowding disabled will not run the crowding routine and will report to it's upstream neighbor that it is crowded. The discharge zone may always have crowding disabled.

One aspect that may be included in embodiments of the present invention is a zone snooze feature with a two zone advance restart. The snooze function temporarily suspends operation of an active zone that has not sensed any product movement for a period of time. Snooze may be a global setting and may be turned on and off at the interface module. The snooze logic monitors the status of the local zone sensor and the status of the first and second upstream sensors. If all three zones have been clear for a period of time, tracked by the snooze timer, set at twenty seconds in one embodiment, the local zone will enter snooze mode. While the zone is in snooze mode, the zone is inactive.

Figure 17:
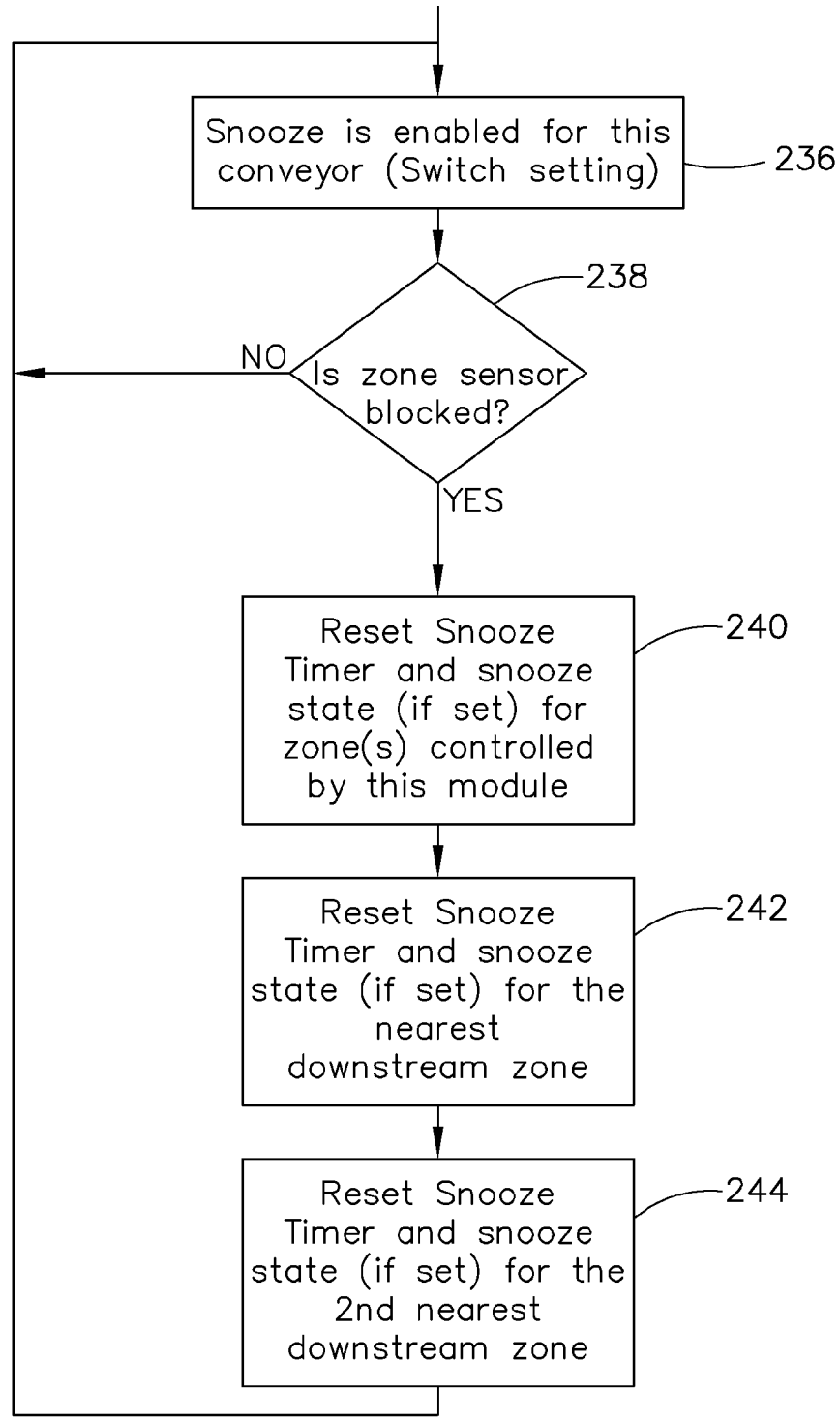
FIG. 17 illustrates control logic related to "waking" a snoozing zone.

FIG. 17 illustrates control logic steps related to "waking" a snoozing zone which is repeatedly executed for each zone sensor of the accumulation conveyor, regardless whether the associated zone is snoozing. Step 236 verifies that snooze is enabled for the particular zone. At step 238, the logic determines whether the local zone sensor is blocked. If it is not, no action is taken and the program returns to the beginning. If, at 238, the local zone sensor is blocked, the logic proceeds to step 240 where the snooze timer and snooze state (if set) is reset for all zones controlled by the particular module. This means that if the snooze state of the zone is snoozing, its state is reset and the zone is wakened. The control then proceeds to step 242 and resets the snooze timer and snooze state (if set) for the nearest downstream zone. The control then proceeds to step 244 and resets the snooze timer and snooze state (if set) for the second nearest downstream zone. Essentially, a zone will exit snooze mode when its local zone sensor or the two immediate upstream zone sensors are blocked. If the sensor of a snoozing zone becomes blocked, the next two downstream zones will be woken up.

Another feature that may be included in embodiments of the present invention is flow and jam detection. If the local zone sensor is blocked and the local zone is active, and the sensor of the downstream zone has been clear for more than a period of time, such as ten seconds, and the upstream zone sensor is blocked, a warning flag is set. The system tries to push through any package in the upstream zone, by coupling the local zone to the downstream zone's logic states. In effect the local zone reports the same logic state (blocked, clear, occupied, not occupied) to the upstream zone that it is receiving from the downstream zone. The causes the upstream zone to be active. If the upstream zone sensor remains blocked for more than a period of time, such as for example, 30 seconds, and the downstream zone sensor has not been blocked during the same time period, then a jam has been detected and the local zone is decoupled from the downstream zone and reports occupied upstream, starting the accumulation process upstream of the jam. If during this 30 second time period, the "push through", the downstream zone sensor becomes blocked, it indicates that product can move through the local zone and the local zone stays coupled to the downstream zone. The system stays in either the jam state or the coupled state until the local zone sensor becomes clear at which time all error and warning flags related to the local zone are canceled. While in such a jam condition, global slug release will function as normal downstream of the jam. The local zone release function is disabled for the jammed zone, with release being subject to the jam detect and push-through logic functionality described herein.

Figure 18:
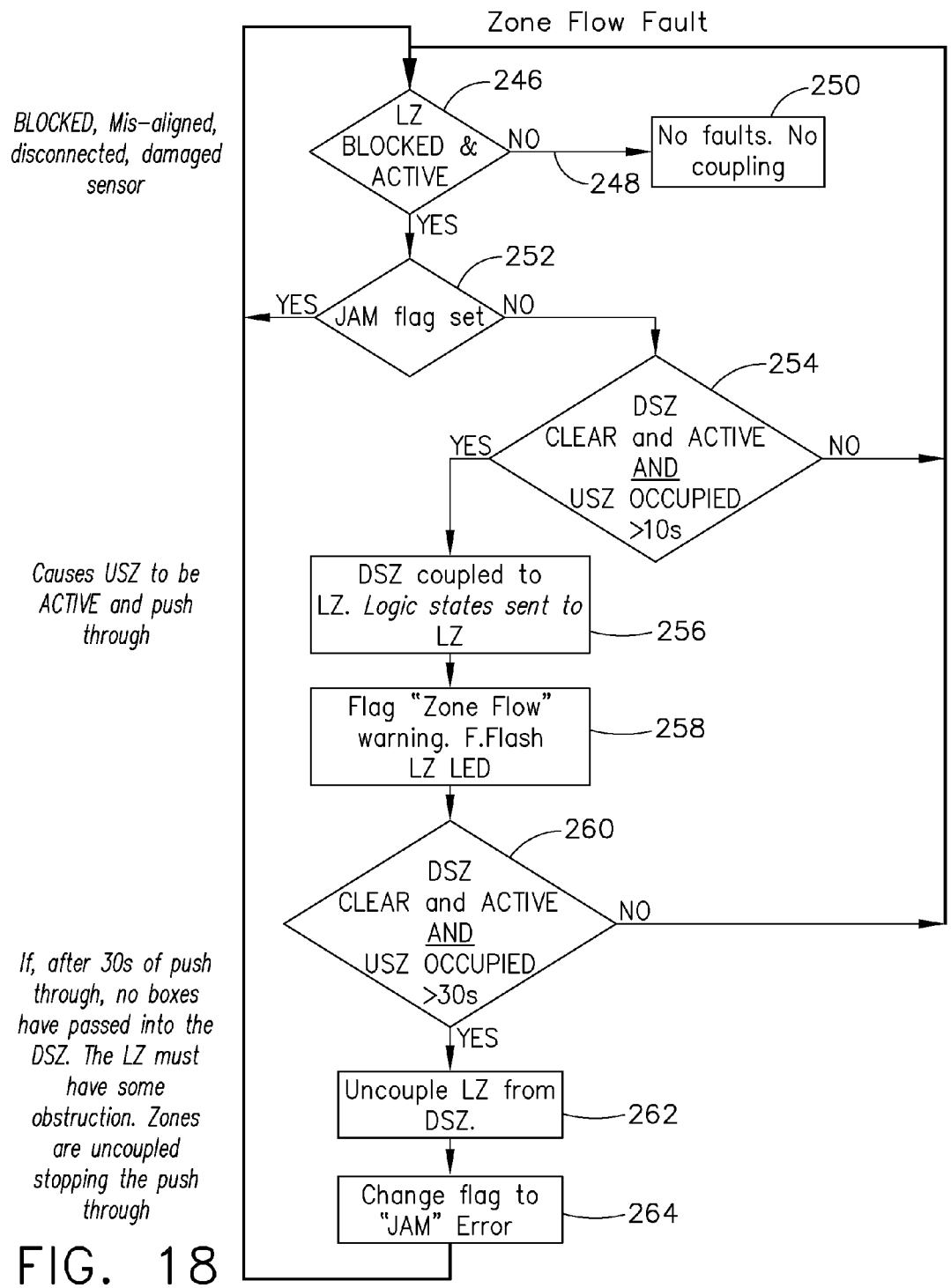
FIG. 18 illustrates the flow and jam detect control logic.

Referring to FIG. 18 which illustrates the flow and jam detect control logic, at 246 the control determines whether the local zone sensor is blocked and if the local zone is active. If either the local zone sensor is not blocked or the local zone is inactive, the control moves to 248, at which it is determined whether the local zone sensor is clear the control logic resets the flags and decouples the local zone if it is coupled. If the local zone sensor is blocked, the control logic exits. If at 246 the local zone sensor is blocked and the local zone is active, the control moves to step 252 where it determines whether the JAM flag is set, indicating that the zone has been flagged as jammed. If the JAM flag is set, the control logic will return to the beginning at step 246. If the JAM flag is not set, the control will proceed to step 254. If at 254 the downstream zone is clear and active, and the upstream zone is occupied, for greater than a time period, in the embodiment depicted, 10 seconds, the control will proceed to step 256 at which the downstream zone is coupled to the local zone, that is the logic stats of the downstream zone are sent to the local zone. From there, the control goes to step 258 and sets the flag Zone Flow warning and flashes the local zone LED. The control proceeds to step 260 and it tests whether the downstream zone is clear and active an the upstream zone is blocked for greater than a time period, in the embodiment, 30 seconds. If it has been, then the attempt to push through the jam is terminated and at step 262 the local zone is uncoupled from the downstream zone. If it has been less than 30 seconds, the control logic loops back to 246 and continues to attempt to push through the jam. From step 262, the control sets the JAM flag at 264 and then returns to 246. With the JAM flag set, the control will loop out at step 252, avoiding additional attempts at pushing through the jam.

In some of the FIGS. used herein, abbreviations are used. The following chart sets forth some of them:
DZCM—Dual Zone Control Module
DZIM—Dual Zone Interface Module
DZCS—Dual Zone Control System
LZ—Local Zone
DSZ—Downstream Zone
USZ—Upstream Zone
DSS—Downstream Sensor
LSS—Local Zone Sensor The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims submitted herewith.

The invention claimed is:

1. A method of controlling an accumulation conveyor to selectively accumulate a plurality of articles being conveyed by the accumulation conveyor, the accumulation conveyor comprising a plurality of zones, one of said plurality of zones comprising a discharge zone, said plurality of zones comprising at least a first zone and second zone, said second zone being downstream of said first zone, the method comprising:
    a. determining whether said second zone is occupied by a second article;
    b. determining whether said first zone is occupied by a first article; and
    c. setting said first zone to inactive state upon determining that said first and second zones are occupied.

2. The method of claim 1, further comprising subsequent to setting said first zone to inactive state upon determining that said first and second zones are occupied, maintaining said first zone in its current state if said first zone becomes not occupied while said second zone remains occupied.

3. The method of claim 2, wherein said first zone's current state is active.

4. The method of claim 2, wherein said first zone's current state is inactive.

5. The method of claim 1, further comprising subsequent to setting said first zone to inactive state upon determining that said first and second zones are occupied, setting said first zone to accumulated state.

6. The method of claim 1, further comprising subsequent to to setting said first zone to inactive state upon determining that said first and second zones are occupied, setting said first zone to active state upon determining that said second zone is not occupied.

7. The method of claim 1, wherein determining whether said second zone is occupied by said second article comprises determining whether said second article has been present at a predetermined location for a predetermined length of time.

8. The method of claim 1, wherein determining whether said first zone is occupied by said first article comprises determining whether said first article has been present at a predetermined location for a predetermined length of time.

9. A method of controlling an accumulation conveyor to selectively accumulate a plurality of articles being conveyed by the accumulation conveyor, the accumulation conveyor comprising a plurality of zones, one of said plurality of zones comprising a discharge zone, said plurality of zones comprising at least a first zone, a second zone and a third zone, said second zone being downstream of said first zone said third zone being downstream of said second zone, the method comprising:
    a. determining whether said second zone is occupied by a second article and said third zones is occupied by a third article;
    b. determining whether said first zone is occupied by a first article; and
    c. setting said first zone to inactive state upon determining that said first, second and third zones are occupied.

10. The method of claim 9, further comprising subsequent to setting said first zone to inactive state upon determining that said first, second and third zones are occupied, maintaining said first zone in its current state if said first zone becomes not occupied while said second and third zones remain occupied.

11. The method of claim 10, wherein said first zone's current state is active.

12. The method of claim 10, wherein said first zone's current state is inactive.

13. The method of claim 9, wherein further comprising subsequent to setting said first zone to inactive state upon determining that said first, second and third zones are occupied, setting said first zone to accumulated state.

14. The method of claim 13, further comprising subsequent to setting said first zone to inactive state upon determining that said first, second and third zones are occupied, setting said first zone to active state upon determining that said second or third is not occupied.

15. The method of claim 9, wherein determining whether said third zone is occupied by said third article comprises determining whether said third article has been present at a predetermined location for a predetermined length of time.

16. The method of claim 9, wherein determining whether said second zone is occupied by said second article comprises determining whether said second article has been present at a predetermined location for a predetermined length of time.

17. The method of claim 9, wherein determining whether said first zone is occupied by said first article comprises determining whether said first article has been present at a predetermined location for a predetermined length of time.

18. A method of controlling an accumulation conveyor to selectively accumulate a plurality of articles being conveyed by the accumulation conveyor, the accumulation conveyor comprising a plurality of zones, said plurality of zones comprising at least a first zone, a second zone and a third, said second zone being downstream of said first zone, said third zone being upstream of said first zone, the method comprising:

a. determining whether said first zone is occupied by a first article;
b. determining whether said first zone is in an active state;
c. determining whether said second zone is occupied by a second article;
d. determining whether said second zone is in an active state;
e. determining whether a third article has been at a third predetermined location in said third zone for at least a first predetermined length of time; and
f. if said first zone is determined to be occupied, said first zone is determined to be in an active state, said second zone is determined to be not occupied, said second zone is determined to be in an active state, and said third article is determined to be at said third predetermined location in said third zone for at least said first predetermined length of time, controlling said third zone based on conditions of said second zone.

19. The method of claim 18, further comprising while controlling said third zone based on conditions of said second zone:

a. determining whether the second zone is occupied;
b. determining whether said second zone is in an active state;
c. determining whether said third zone has been occupied for at least a second predetermined length of time; and
d. if said second zone is determined to be not occupied, said second zone is determined to be in an active state, and said third zone is determined to be occupied for at least said second predetermined length of time, cease controlling said third zone based on conditions of said second zone.

* * * * *